US010710659B2

(12) United States Patent
Kobayashi et al.

(10) Patent No.: US 10,710,659 B2
(45) Date of Patent: Jul. 14, 2020

(54) VEHICLE

(71) Applicant: HONDA MOTOR CO., LTD., Tokyo (JP)

(72) Inventors: Shinji Kobayashi, Wako (JP); Koichi Ishigami, Wako (JP); Tetsutaro Takasugi, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 121 days.

(21) Appl. No.: 16/202,449

(22) Filed: Nov. 28, 2018

(65) Prior Publication Data

US 2020/0164940 A1    May 28, 2020

(51) Int. Cl.
| | |
|---|---|
| *B62J 7/06* | (2006.01) |
| *B62J 15/00* | (2006.01) |
| *B62J 9/21* | (2020.01) |
| *B60K 11/02* | (2006.01) |
| *B62K 5/01* | (2013.01) |

(52) U.S. Cl.
CPC . *B62J 7/06* (2013.01); *B62J 9/21* (2020.02); *B62J 15/00* (2013.01); *B60K 11/02* (2013.01); *B62K 5/01* (2013.01)

(58) Field of Classification Search
CPC ..... B62J 7/06; B62J 9/21; B62J 15/00; B60K 11/02; B62K 5/01
USPC ...................................................... 296/37.1
See application file for complete search history.

(56) References Cited

U.S. PATENT DOCUMENTS

| | | | | |
|---|---|---|---|---|
| 6,582,001 | B2 * | 6/2003 | Yagisawa ............. | B60Q 1/2607 296/37.1 |
| 6,988,573 | B2 * | 1/2006 | Tsuruta .................. | B60K 11/08 123/41.56 |
| 7,210,547 | B2 * | 5/2007 | Nojima ..................... | B62K 5/01 123/41.56 |
| 7,216,733 | B2 * | 5/2007 | Iwami ...................... | B62K 5/01 180/443 |
| 7,303,221 | B2 * | 12/2007 | Takahashi ............... | B60R 11/00 296/37.1 |
| 7,537,499 | B2 * | 5/2009 | Davis ....................... | B60G 3/06 114/360 |
| 7,604,082 | B2 * | 10/2009 | Yanai ....................... | B62K 5/01 180/348 |
| 2006/0231308 | A1 * | 10/2006 | Takahashi ................ | B62K 5/01 180/89.1 |
| 2011/0174569 | A1 * | 7/2011 | Shiina ..................... | B62K 11/02 180/400 |
| 2011/0240397 | A1 * | 10/2011 | Shiina ...................... | B62K 5/01 180/312 |

FOREIGN PATENT DOCUMENTS

JP          59-145674          8/1984

* cited by examiner

*Primary Examiner* — Pinel E Romain
(74) *Attorney, Agent, or Firm* — Rankin, Hill & Clark LLP

(57) ABSTRACT

A vehicle is provided which enables a storage portion and a maintenance lid to be arranged by taking into consideration the position of a body component and the shape of a carrier. A radiator and a reservoir tank are disposed below a front center upper cover. A storage portion is disposed ahead of the radiator and the reservoir tank. A maintenance lid configured to cover the radiator and the reservoir tank from above is provided on the front center upper cover, and the maintenance lid is positioned behind the storage portion.

13 Claims, 14 Drawing Sheets

VEHICLE

BACKGROUND OF THE INVENTION

Field of the Invention

The present invention relates to a vehicle.

Description of the Related Art

Conventionally, there is known a rough-terrain or all-terrain running vehicle in which a carrier, which is formed into a grid shape, is set on an upper portion of a front portion of a body, and a storage portion which stored articles can be put in and out of from above the body is provided on a body cover below a space surrounded by the grid of the carrier (for example, refer to Japanese Patent Laid-Open No. 59-145674).

In Japanese Patent Laid-Open No. 59-145674, since no body component exists below the body cover, there is a certain degree of freedom in setting the storage portion and a maintenance lid on the body cover; however, in the case where a body component such as a radiator exists below the body cover, since the degree of freedom in disposing the storage portion and the maintenance lid is reduced, the storage portion and the maintenance lid need to be arranged by taking into consideration the position of the body component and the shape of the carrier.

An object of the invention is to provide a vehicle enabling a storage portion and a maintenance lid to be arranged by taking into consideration the position of a body component and the shape of a carrier.

SUMMARY OF THE INVENTION

There is provided a vehicle comprising a front body cover (48) provided between a pair of left and right front mudguards (26) configured to cover above a pair of left and right front wheels (12), a storage portion (83) being provided on the front body cover (48), a carrier (32) formed by combining frame members (71, 72) into a grid shape being disposed above the front body cover (48), the storage portion (83) being set in a space surrounded by the grid of the carrier (32) when seen from above, wherein a body component (103) is disposed below the front body cover (48), wherein the storage portion (83) is disposed ahead of the body component (103), wherein a maintenance lid (84) configured to cover the body component (103) is provided on the front body cover (48), and wherein the maintenance lid (84) is located behind the storage portion (83).

In the configuration described above, a plurality of bridge portions (72, 75) disposed before and after may be formed by the frame members (71, 72), the carrier (32) may be made up of a pair of left and right resting portions (51) and at least a pair of the bridge portions (72, 75) configured to connect together the left and right resting portions (51), and the storage portion (83) may be disposed in a space surrounded by the left and right resting portions (51) and the bridge portions (72, 75) when seen from above.

In the configuration described above, the bridge portion (72) may be disposed so as to extend in a vehicle's width direction between the storage portion (83) and the maintenance lid (84), when seen from above.

In the configuration described above, a lid (86) supported swingably may be provided on the storage portion (83), the lid (86) may comprise a hinge portion (86a) at a rear end portion so as to open from a front side to a rear side of the body, and the maintenance lid (84) may comprise an engagement portion (84a) on the front side of the body and comprise a lock portion (84b) on the rear side of the body so as to open from the rear side to the front side of the body.

In the configuration described above, the lid (86) of the storage portion (83) may comprise a cut-out portion (86c) on a front side.

In the configuration described above, the body component may be an engine cooling component (103) made up of a radiator (101) and a reservoir tank (102), an air guide portion (110) configured to guide running air to the radiator (101) may be formed below the front body cover (48) and ahead of the radiator (101), and the storage portion (83) may be positioned in an air guide space (107) formed in the air guide portion (110).

In the configuration described above, a lower surface of the storage portion (83) may be positioned above a core (101c) of the radiator (101).

In the vehicle, since the body component is disposed below the front body cover, the storage portion is disposed ahead of the body component, the maintenance lid configured to cover the body component is provided on the front body cover, and the maintenance lid is positioned behind the storage portion, the storage portion can be placed by avoiding the body component. In addition, since the storage portion is formed inside the space surrounded by the grid of the carrier when seen from above, stored articles can easily be put in and out of the storage portion. Further, the maintenance lid is disposed behind the storage portion, whereby the body component can be serviced for maintenance from an upper side of the body.

In the configuration described above, since a plurality of bridge portions disposed before and after are formed by the frame members, the carrier is made up of the pair of left and right resting portions and at least a pair of the bridge portions configured to connect together the left and right resting portions, and the storage portion is disposed in the space surrounded by the left and right resting portions and the bridge portions when seen from above, the vehicle can be constructed so as to facilitate the egress and ingress of stored articles from and into the storage portion while ensuring the restability of the carrier by the resting portions.

In the configuration described above, since the bridge portion is disposed so as to extend in the vehicle's width direction between the storage portion and the maintenance lid when seen from above, the carrier does not interrupt the egress and ingress of stored articles from and into the storage portion and the opening and closing of the maintenance lid, whereby the restability of the carrier can be ensured.

In the configuration described above, since the lid supported swingably is provided on the storage portion, the lid includes the hinge portion at the rear end portion and is opened from a front side to a rear side of the body, and the maintenance lid includes the engagement portion on the front side of the body and includes the lock portion on the rear side of the body and is opened from the rear side to the front side of the body, the lid of the storage portion can be opened from the front of the body, and the maintenance lid can be opened from a rear body riding position or a side of the body.

In the configuration described above, since the lid of the storage portion includes the cut-out portion on the front side, the rider can rise from the riding position on the body to put his or her hand into the cut-out portion to open and close the lid.

In the configuration described above, since the body component is the engine cooling component made up of the radiator and the reservoir tank, the air guide portion configured to guide running air to the radiator is formed below the front body cover and ahead of the radiator, and the storage portion is positioned in the air guide space formed in the air guide portion, the space where to dispose the storage portion is easily ensured, and running air can be applied effectively to the radiator by the air guide portion to thereby improve the cooling capability of the radiator.

In the configuration described above, since the lower surface of the storage portion is positioned above the core of the radiator, the storage portion never interrupts the application of running air to the core of the radiator, thereby making it possible to ensure the cooling capability of the radiator.

BRIEF DESCRIPTION OF THE DRAWINGS

FIG. 12 illustrates plan views illustrating a storage portion and a maintenance opening at the front portion of the body, in which

DETAILED DESCRIPTION OF THE PREFERRED EMBODIMENT

Figure 1:
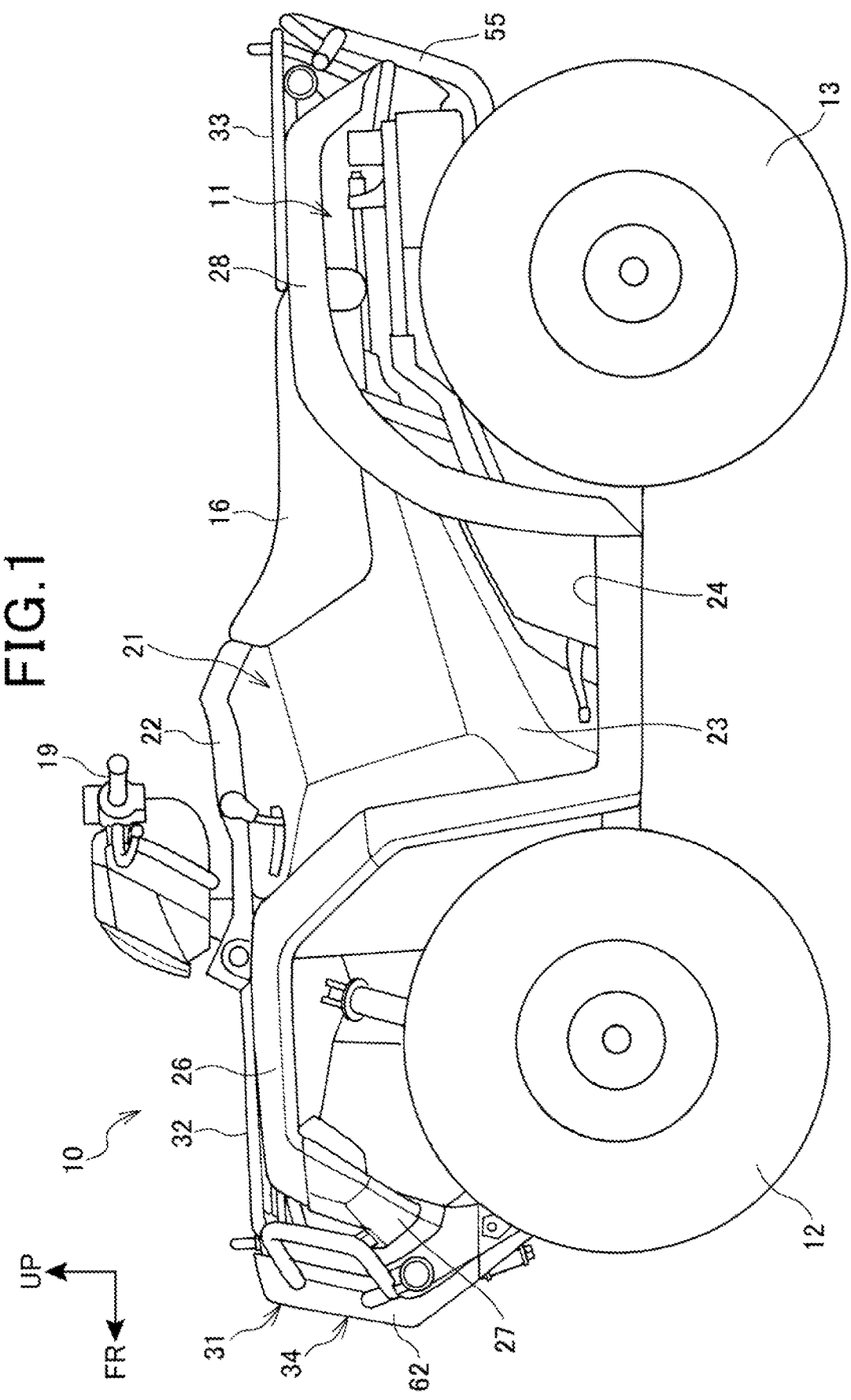
FIG. 1 is a left side view of an all-terrain running vehicle according to an embodiment of the present invention.

Hereinafter, referring to drawings, an embodiment of the present invention will be described. In the following description, when referred to, directions denoting front, rear, left, right, up and down coincide with those directions with respect to a body of a vehicle unless described otherwise. In addition, when shown in the drawings, reference character FR denotes a front of the body, reference character UP denotes a top of the body, and reference character LH denotes a left of the body.

FIG. 1 is a left side view of a rough-terrain or all-terrain running vehicle 10 according to an embodiment of the present invention.

The all-terrain running vehicle 10 (hereinafter, referred to simply as the "vehicle 10") includes a body frame 11, a pair of left and right front wheels 12, a pair of left and right rear wheels 13, and a power unit (not shown).

The left and right wide front wheels 12 are mounted at a front portion of the body frame 11 via suspension arms, not shown, and the left and right wide rear wheels 13 are mounted at a rear portion of the body frame 11 via suspension arms, not shown.

The power unit made up of an engine and a transmission is mounted at a central portion of the body frame 11, and the left and right front wheels 12 and the left and right rear wheels 13 are each driven by the power unit.

The vehicle 10 is a saddle riding vehicle in which a rider straddles a seat 16 supported at an upper portion of the body frame 11.

A handlebar 19 is provided at a front of the body of the vehicle 10 to steer the left and right front wheels 12.

The vehicle 10 includes a body cover 21 configured to cover the body frame 11.

The body cover 21 includes a center cover 22, a pair of left and right body side covers 23, a pair of left and right footrest floors 24, a pair of left and right front mudguards 26, a front cover 27, and a pair of left and right rear mudguards 28.

The center cover 22 is disposed below the handlebar 19 and at a front of the seat 16. The left and right body side covers 23 extend downwards from both edges of the center cover 22. The pair of left and right footrest floors 24 are disposed below the body side covers 23 and constitute portions where the rider rests his or her feet. The left and right front mudguards 26 are disposed ahead of the left and right footrest floors 24 so as to cover the left and right front wheels 12 from above.

The front cover 27 covers a front end portion of the body. The left and right rear mudguards 28 are disposed behind the left and right footrest floors 24 so as to cover the left and right rear wheels 13 from above.

A front bumper 31 is disposed at a front of the front cover 27. A front carrier 32 is disposed above the left and right front mudguards 26, and a rear carrier 33 is disposed above the left and right rear mudguards 28.

Figure 2:
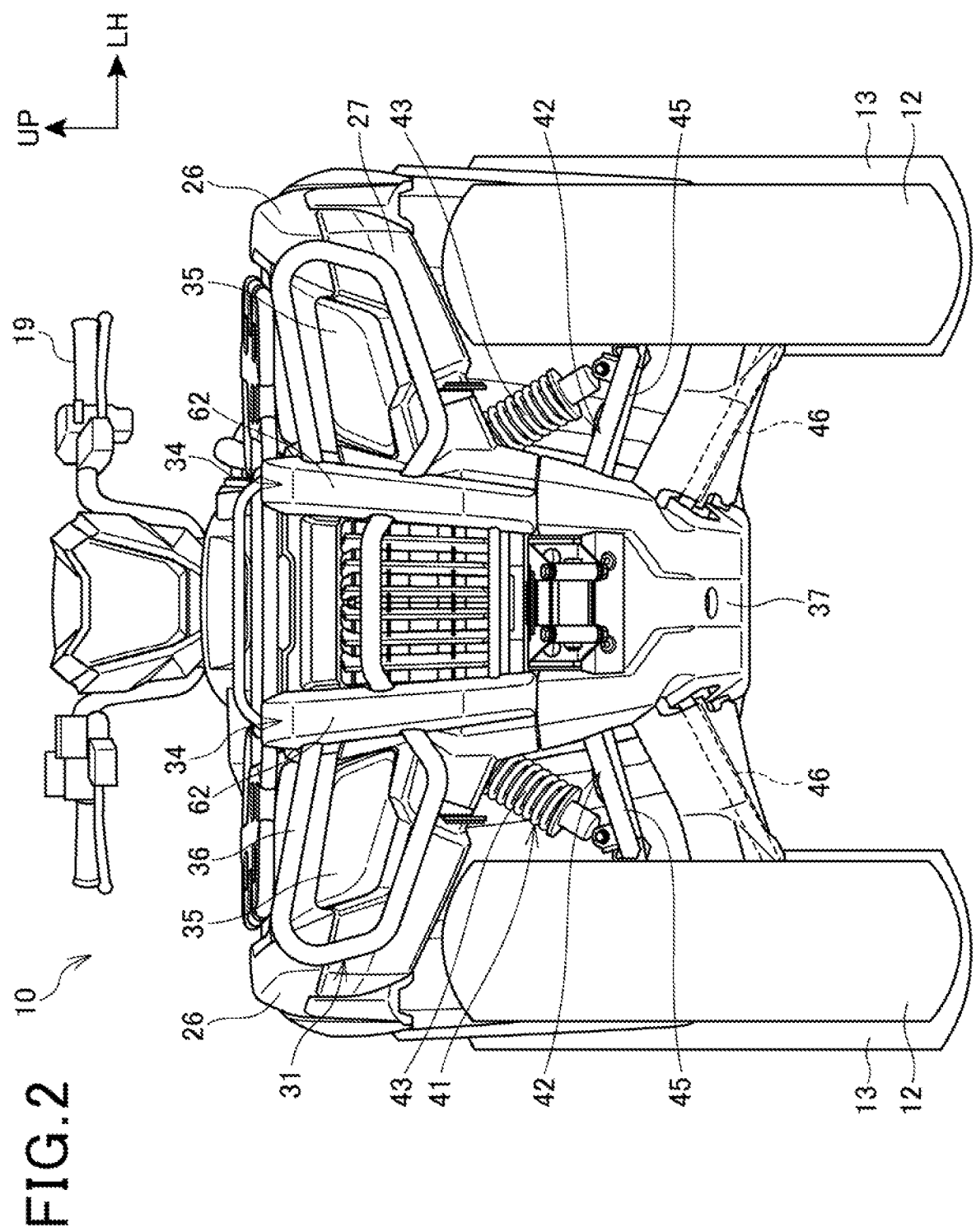
FIG. 2 is a front view of the vehicle.

FIG. 2 is a front view illustrating the vehicle 10.

A pair of left and right headlamps 35 and the front bumper 31 are provided at the front portion of the body, and the front bumper 31 covers the front portion of the body from a central portion of the front portion of the body to peripheries of the left and right headlamps 35 from the front of the vehicle.

The left and right headlamps 35 are disposed between the left and right front mudguards 26 and the front cover 27.

The front bumper 31 is made up of a pair of left and right upwardly/downwardly extending portions 34 configured to extend in an up-down direction and a transversely extending portion 36 configured to surround the peripheries of the left and right headlamps 35 and to extend in a vehicle's width direction.

A skid plate 37 attached to a lower portion of the front portion of the body frame 11 (refer to FIG. 1) is provided below the front bumper 31. The skid plate 37 protects the lower portion of the front portion of the body frame 11 and a lower portion of the power unit from projecting portions on a road surface or flying pieces of stone.

The left and right front wheels 12 are suspended by front suspensions 41, respectively. The front suspensions 41 include a pair of left and right suspension arms 42 upwardly/downwardly swingably attached to the body frame 11 and front cushion units 43, which are shock absorbers extended to the left and right suspension arms 42 and the body frame 11.

The left and right suspension arms 42 are each made up of an upper arm 45 and a lower arm 46 which are both swingably supported on the body frame 11. Distal ends of the upper arm 45 and the lower arm 46 are both swingably connected to a knuckle (not shown), and the front wheel 12 is supported rotatably on the knuckle.

Lower end portions of the left and right front cushion units 43 are connected to the left and right upper arms 45.

Figure 3:
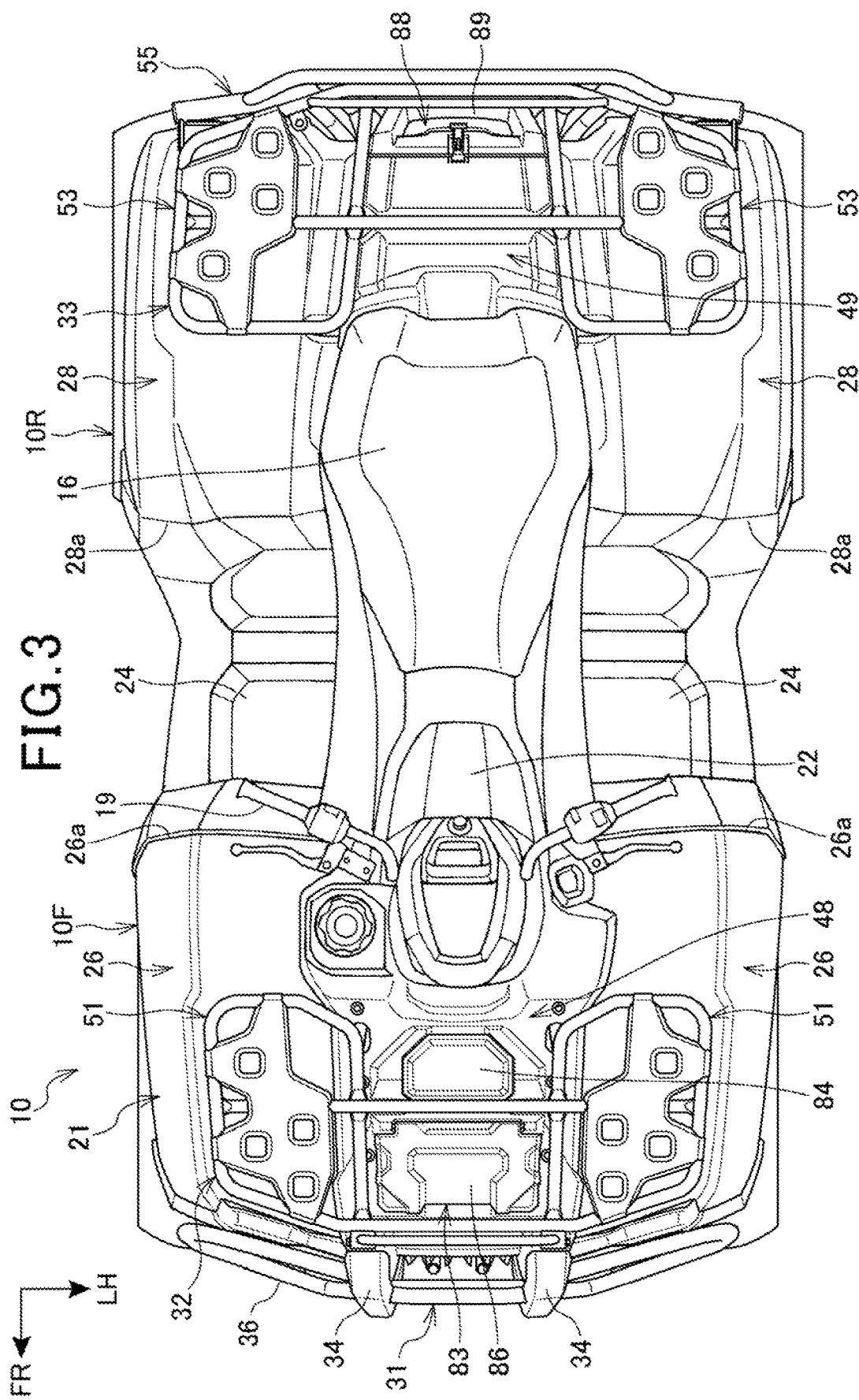
FIG. 3 is a plan view of the vehicle.

FIG. 3 is a plan view illustrating the vehicle 10.

In the vehicle 10, as a matter of convenience, a portion of the body located further ahead of the vehicle than rear edges 26a of the left and right front mudguards 26 is referred to as a front body 10F, and a portion of the body located further behind front edges 28a of the left and right rear mudguards 28 is referred to as a rear body 10R.

The transversely extending portion 36 of the front bumper 31 extends in the vehicle's width direction between the left and right upwardly/downwardly extending portions 34, and is inclined so as to be located rearwards gradually as the transversely extending portion 36 extends transversely outwards, transversely outwards of the left and right upwardly/downwardly extending portions 34.

A front center upper cover 48, which makes up the body cover 21, is disposed between the left and right front mudguards 26, and a rear center upper cover 49, which makes up the body cover 21, is disposed between the left and right rear mudguards 28 and behind the seat 16.

The front carrier 32 is disposed above the left and right front mudguards 26 and the front center upper cover 48 so as to straddle the left and right front mudguards 26 and the front center upper cover 48.

The front carrier 32 includes a pair of left and right side resting portions 51. Goods can be fixed by being rested on one or both of the left and right side resting portions 51 or being rested on the left and right side resting portions 51 so as to straddle them. The left and right side resting portions 51 are portions having a rectangular shape in a plan view, which are transversely disposed above the front mudguards 26 and the front center upper cover 48.

The rear carrier 33 is disposed above the left and right rear mudguards 28 and the rear center upper cover 49 so as to straddle the left and right rear mudguards 28 and the rear center upper cover 49.

The rear carrier 33 includes a pair of left and right side resting portions 53. Goods can be fixed by being rested on one or both of the left and right side resting portions 53 or being rested on the left and right side resting portions 53 so as to straddle them. The left and right side resting portions 53 are portions having a rectangular shape in a plan view, which are transversely disposed above the rear mudguards 28 and the rear center upper cover 49.

A rear end portion of the rear carrier 33 is attached to a rear bumper 55 which is supported on the body frame 11.

Figure 4:
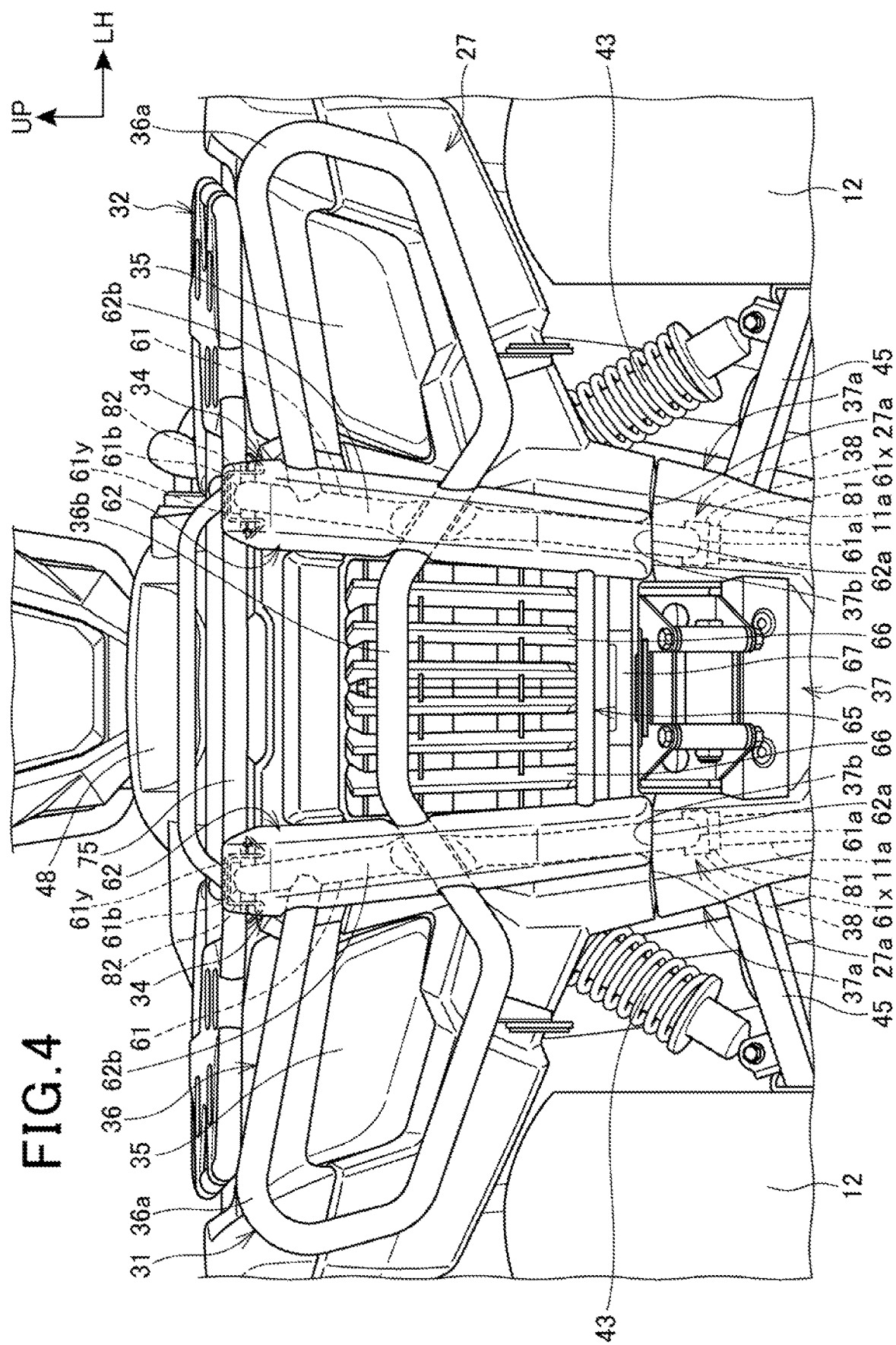
FIG. 4 is a front view illustrating a front bumper and a periphery thereof.
Figure 5:
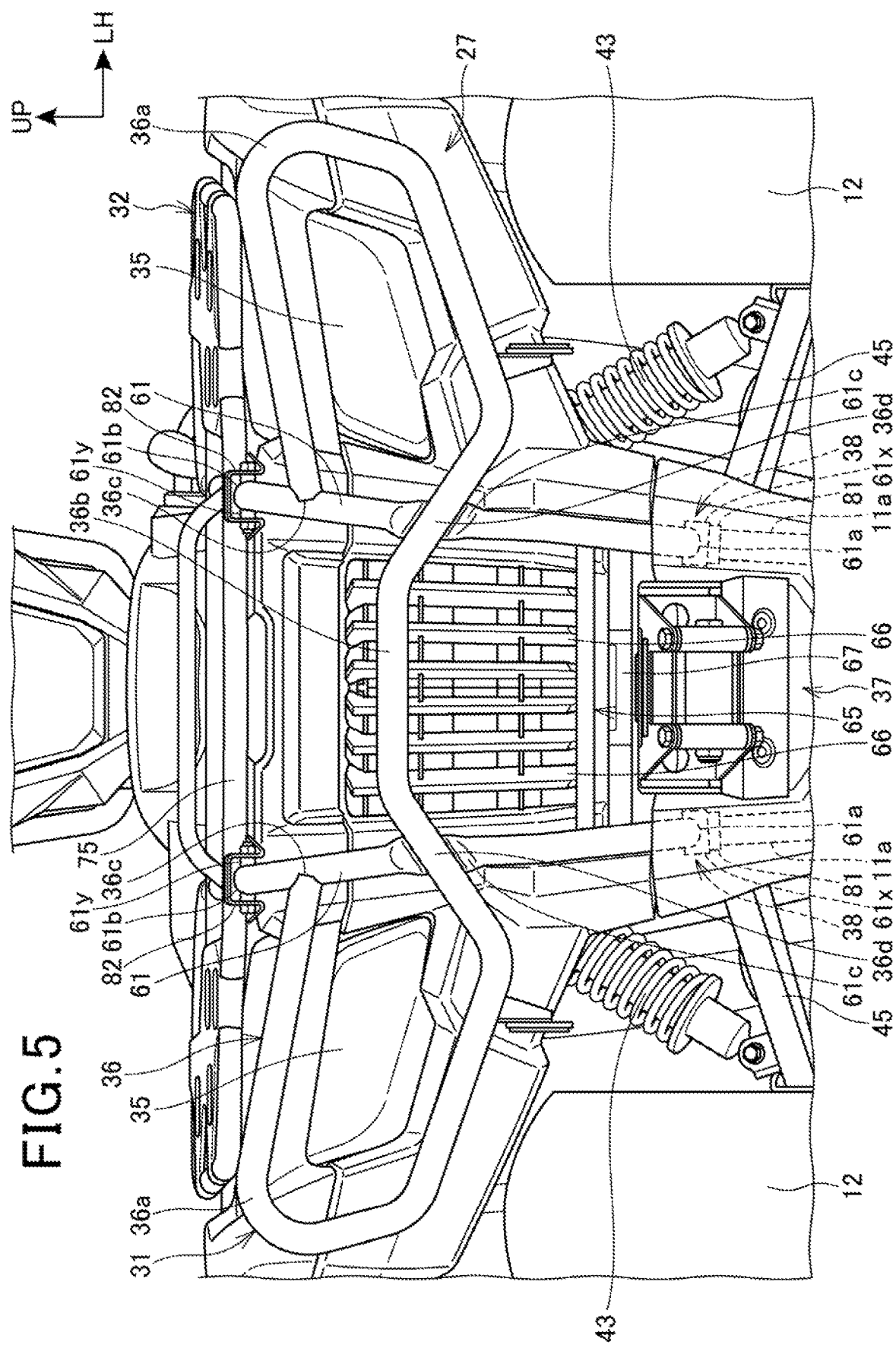
FIG. 5 is a front view illustrating a state where bumper main portions are removed from FIG. 4.
Figure 6:
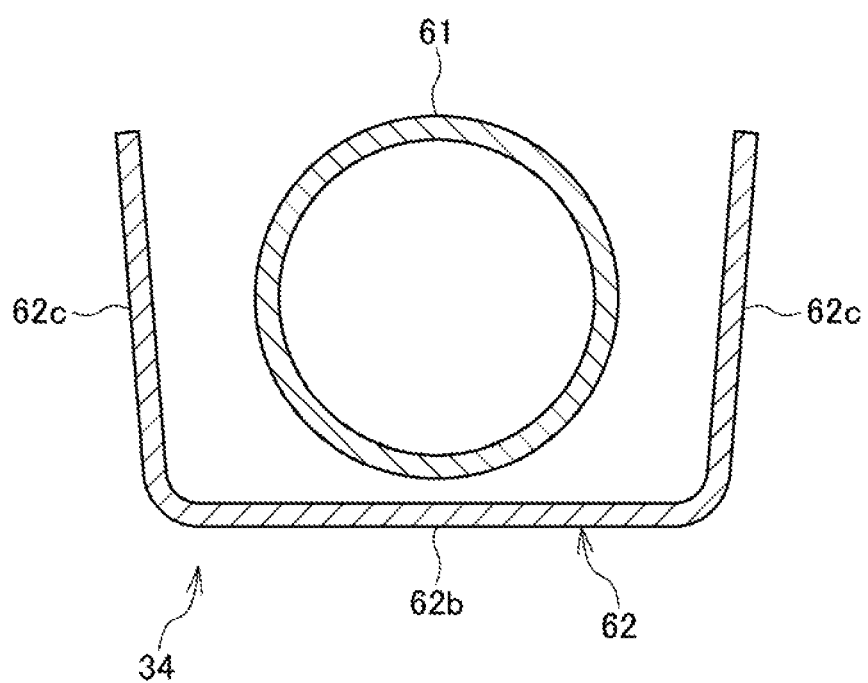
FIG. 6 is a sectional view taken along a line VI-VI in FIG. 4.

FIG. 4 is a front view illustrating the front bumper 31 and a periphery of the bumper. FIG. 5 is a front view illustrating a state where bumper main portions 62 are removed from FIG. 4. FIG. 6 is a sectional view taken along a line VI-VI in FIG. 4.

As illustrated in FIGS. 4 and 5, the left and right upwardly/downwardly extending portions 34 of the front bumper 31 are made up of a pair of left and right upwardly/downwardly extending frame portions 61 and the bumper main portions 62 configured to cover the pair of left and right upwardly/downwardly extending frame portions 61 from a front of the frame portions 61, respectively.

In the left and right upwardly/downwardly extending frame portions 61, lower end portions 61a are fastened detachably to lower portions (portions located behind the skid plate 37) of the body frame 11, and upper end portions 61b are fastened detachably to a front end portion of the front carrier 32. Specifically, connecting portions 61x are provided at the lower end portions 61a, and the connecting portions 61x are bolted detachably to connecting pieces 81 attached to the lower portions of the body frame 11. Additionally, connecting portions 61y are provided at the upper end portions 61b, and the connecting portions 61y are detachably bolted to connecting pieces 82 attached to the front end portion of the front carrier 32.

That is, the front bumper 31 can be attached to and detached from the body frame 11.

The left and right upwardly/downwardly extending portions 34 (specifically, the left and right upwardly/downwardly extending frame portions 61 and the left and right bumper main portions 62) are gradually spaced apart from each other transversely outwards toward the upper part.

The left and right bumper main portions 62 are plate-shaped members that are fixed to the transversely extending portion 36 through welding. The width in the vehicle's width direction of the single bumper main portion 62 is gradually increased toward the upper part. The bumper main portions 62 are made of steel. However, the bumper main portions 62 may be made of resin.

The left and right bumper main portions 62 cover the upper end portions 61b of the corresponding upwardly/downwardly extending frame portions 61 connected to the front carrier 32 from a front thereof.

The transversely extending portion 36 is made up of a single bent tube and includes laterally directed U-shaped lamp surrounding frame portions 36a, which are disposed on the peripheries of the left and right headlamps 35 when seen from the front of the bumper to protect the headlamps 35 from the front of the vehicle, and a cross frame portion 36b configured to connect the left and right lamp surrounding frame portions 36a together.

The transversely extending portion 36 is mounted so as to extend across the left and right upwardly/downwardly extending frame portions 61.

Upper inner end portions 36c of the lamp surrounding frame portions 36a are brought into abutment with upper side portions of the upwardly/downwardly extending frame portions 61 and are fixed thereto through welding. Connecting portions 36d between the lamp surrounding frame portions 36a and the cross frame portion 36b are fixed through welding to compressed portions 61c which are formed by depressing relevant portions of the upwardly/downwardly extending frame portions 61 in a front-rear direction.

A radiator grille 65 provided on the front cover 27 is disposed between the left and right upwardly/downwardly extending frame portions 61, when seen from the front of the bumper, and behind the left and right upwardly/downwardly extending frame portions 61.

The radiator grille 65 includes a plurality of vertically extending louvers 66. A radiator 67 is disposed behind the radiator grille 65.

A pair of left and right lower end portions 27a formed at left and right sides of the front cover 27 so as to project downwards and the lower end portions 62a of the bumper main portions 62 and respective upper end portions 37b of extending portions 37a formed at left and right sides of the skid plate 37 so as to project upwards face so as to continue in the up-down direction.

The left and right extending portions 37a of the skid plate 37 cover the connecting pieces 81 attached to a pair of left and right frame members 11a of the body frame 11 and the connecting portions 61x provided at the lower end portions 61a of the upwardly/downwardly extending frame portions 61 from the front of the vehicle.

The left and right frame members 11a of the body frame 11 and the left and right connecting pieces 81 described above make up a pair of left and right bumper lower portion support portions 38 configured to support a lower portion of the front bumper 31.

As illustrated in FIG. 6, the upwardly/downwardly extending frame portions 61 are each made up of a round tube. The bumper main portion 62 is a member configured to cover the corresponding upwardly/downwardly extending frame portion 61 from the front of the vehicle and both sides in the vehicle's width direction. The bumper main portion 62 is made up of a front wall 62b and left and right side walls 62c and hence has a U-shaped cross section.

The front wall 62b is formed flat, and the left and right side walls 62c are formed so as to move away from each other transversely outwards as they extend toward a rear of the vehicle.

In addition, the front wall 62b is configured to increase its width in the vehicle's width direction gradually toward the upper part, as illustrated in FIG. 4.

Figure 7:
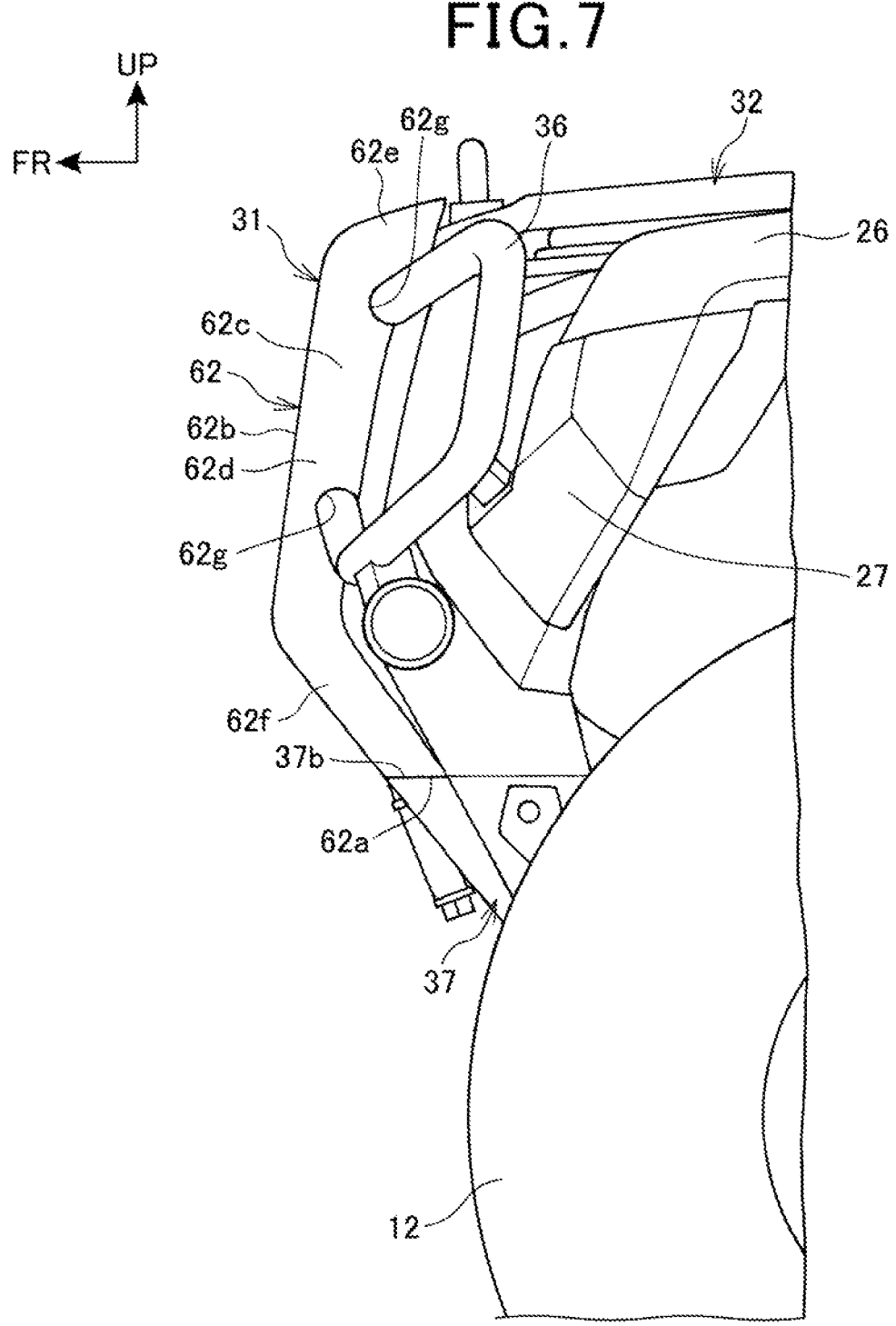
FIG. 7 is a left side view illustrating the front bumper and the periphery thereof.

FIG. 7 is a left side view illustrating the front bumper 31 and a periphery thereof.

The bumper main portion 62 of the front bumper 31 is made up of an upwardly/downwardly rising portion 62d extending in the up-down direction, an upper inclined portion 62e extending obliquely upwards toward the rear of the vehicle from an upper end of the upwardly/downwardly rising portion 62d, and a lower inclined portion 62f extending obliquely downwards toward the rear of the vehicle from a lower end of the upwardly/downwardly rising portion 62d.

Left and right side walls 62c of the upwardly/downwardly rising portion 62d include a plurality of notches 62g through which the transversely extending portion 36 is passed.

A lower end portion 62a of the lower inclined portion 62f and the upper end portion 37b of the skid plate 37 are disposed flush with each other.

In this way, the lower end portion 62a of the lower inclined portion 62f and the upper end portion 37b of the skid plate 37 are made flush with each other, whereby the bumper main portion 62 and the skid plate 37 are allowed to appear as being integrated into one unit, thereby making it possible to improve the external appearance of the front portion of the body.

Figure 8:
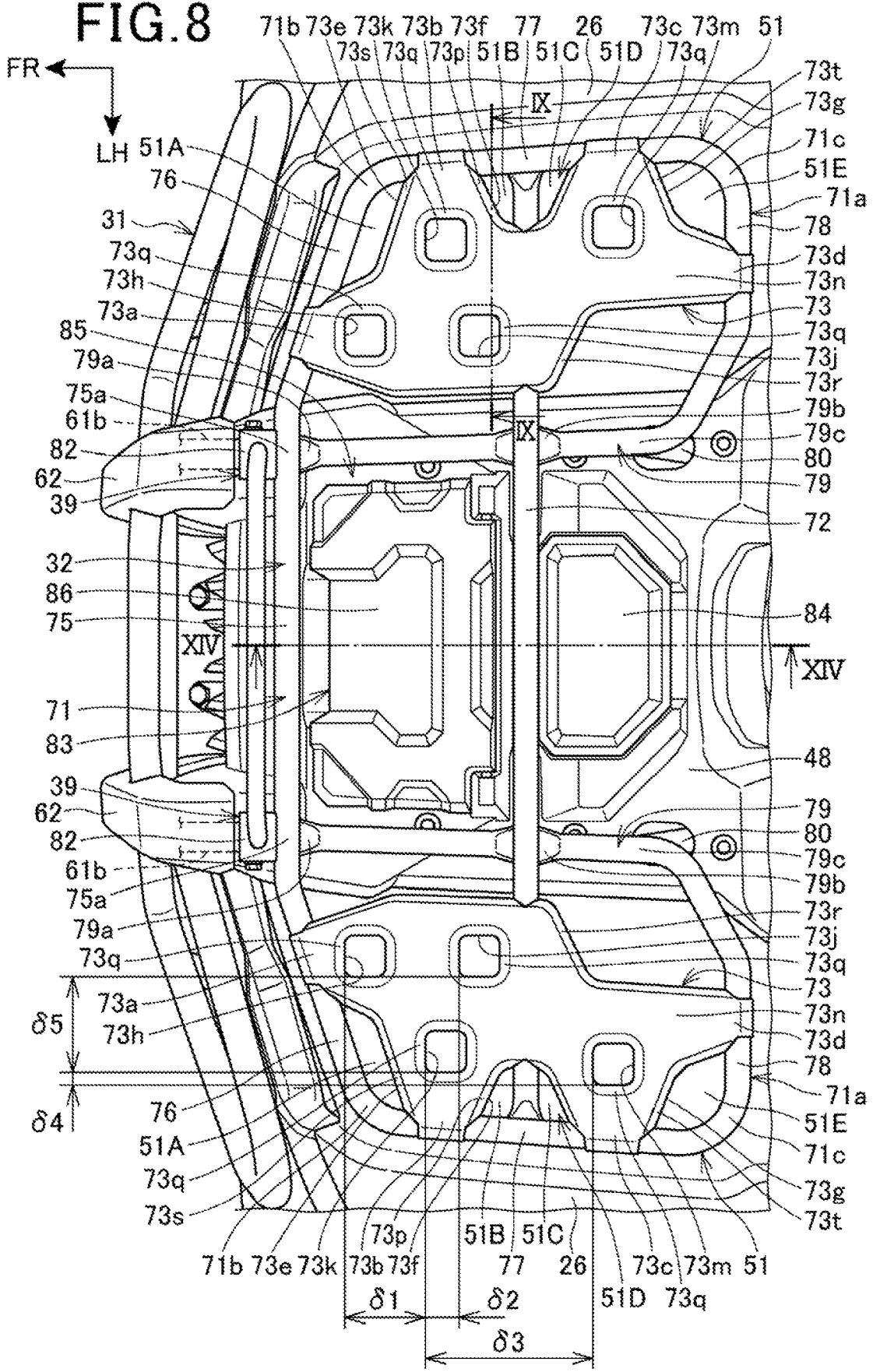
FIG. 8 is a plan view illustrating a front carrier and a periphery thereof.

FIG. 8 is a plan view illustrating the front carrier 32 and a periphery thereof.

The front carrier 32 includes a loop frame portion 71 made up of a single tube frame including loop-shaped loop portions 71a at a left and right thereof, a cross member 72 extending in the vehicle's width direction so as to straddle the left and right loop portions 71a, and resting plates 73 attached to the left and right loop portions 71a.

The loop frame portion 71 is made up of a front cross member portion 75, a pair of left and right front inclined frame portions 76, a pair of left and right rearward extending frame portions 77, a pair of left and right inwardly extending frame portions 78, and a pair of left and right forward extending frame portions 79.

The front cross member portion 75 is disposed ahead of the cross member 72 so as to extend in the vehicle's width direction. The left and right front inclined frame portions 76 extends transversely outwards obliquely toward the rear from both end portions of the front cross member portion 75. The left and right rearward extending frame portions 77 extend toward the rear from distal ends of the left and right front inclined frame portion 76. Both end portions of the cross member 72 are attached to the left and right rearward extending frame portions 77.

The left and right inwardly extending frame portion 78 extend transversely inwards and transversely inwards obliquely toward the front of the vehicle from the left and right rearward extending frame portions 77. The left and right forward extending frame portions 79 extend toward the front of the vehicle from inner ends of the inwardly extending frame portions 78.

Front end portions 79a of the forward extending frame portions 79 are collapsed into a flat-plate shape to be attached to the front cross member portion 75 and projected to the front of the vehicle more than the front cross member portion 75. Rear end portions 79c of the forward extending frame portions 79 are attached to upper ends of frame members 80 which extend from the body frame 11 (refer to FIG. 1) below the front center upper cover 48.

Left and right end portions 75a of the front cross member portion 75 are fixed to front end portions 79a of the left and right forward extending frame portions 79 through welding and projected further transversely outwards than the forward extending frame portions 79 to be connected to the front inclined frame portions 76.

Connecting pieces 82 are attached to the front cross member portion 75 and the front end portions 79a of the left and right forward extending frame portions 79, and the connecting portions 61y of the left and right upwardly/downwardly extending frame portions 61 of the front bumper 31 shown in FIG. 4 are bolted to the left and right connecting pieces 82.

Returning to FIG. 8, the loop frame portions 71 and the left and right connecting pieces 82 described above make up a pair of left and right bumper upper portion support portion 39 supporting the upper portion of the front bumper 31.

The left and right forward extending frame portions 79 are collapsed at their middle portions to form compressed portions 79b, and the cross member 72 is fixed to the left and right compressed portions 79b and the left and right rearward extending frame portions 77 through welding.

The loop portions 71a each include both end portions 75a of the front cross member portion 75, the front inclined frame portion 76, the rearward extending frame portion 77, the inwardly extending frame portion 78, and the forward extending frame portion 79.

The resting plates 73 are each formed by bending and making holes in a flat plate and are attached to the front inclined frame portions 76, the rearward extending frame portions 77, the inwardly extending frame portions 78 and the cross member 72.

The resting plates 73 each include a plurality of arm portions 73a, 73b, 73c, 73d, cut-out portions 73e, 73f, 73g which are formed between these arm portions 73a, 73b, 73c, 73d, and a plurality of mounting holes 73h, 73j, 73k, 73m. Various types of attachments capable of fixing, holding and accommodating goods are detachably locked on edge portions of the plurality of mounting holes 73h, 73j, 73k, 73m.

Here, one mounting hole 73k is set as a reference hole. The mounting hole 73h is offset forwards by $\delta 1$ with respect to the mounting hole 73k, the mounting hole 73j is offset rearwards by $\delta 2$ with respect to the mounting hole 73k, and the mounting hole 73m is offset rearwards by $\delta 3$ with respect to the mounting hole 73k.

In addition, the mounting hole 73m is offset transversely outwards by $\delta 4$ with respect to the mounting hole 73k, and the mounting holes 73h, 73j are offset transversely inwards by $\delta 5$ with respect to the mounting hole 73k.

In this way, a mounting position (a mounting direction) of an attachment having a plurality of mounting portions can be determined by disposing the mounting holes 73h, 73j, 73k, 73m in such a way that the positions of these mounting holes are offset from one another, thereby making it possible to increase the degree of freedom of a mounting position of an attachment having only one mounting portion.

The arm portion 72a is attached to the front inclined frame portion 76, and the arm potions 73b, 73c are attached to the rearward extending frame portion 77, and the arm portion 73d is attached to the inwardly extending frame portion 78.

The cut-out portion 73e is formed inside a corner portion 71b formed by the front inclined frame portion 76 and the rearward extending frame portion 77. The cut-out portion 73e, the front inclined frame portion 76 and the rearward extending frame portion 77 form a closed space 51A.

The cut-out portion 73f is formed inside the rearward extending frame portion 77. The cut-out portion 73f, the cross member 72 and the rearward extending frame portion 77 form a pair of closed spaces 51B, 51C on both sides of the cross member 72. The pair of spaces 51B, 51C forms a space 51D.

The cut-out portion 73g is formed inside a corner portion 71c formed by the rearward extending frame portion 77 and the inwardly extending frame portion 78. The cut-out portion 73g, the rearward extending frame portion 77 and the inwardly extending frame portion 78 form a closed space 51E.

An end portion of the cross member 72 is disposed inside the cut-out portion 73f.

The loop portion 71a can easily be gripped by providing the cut-out portions 73e, 73g described above inside the corner portions 71b, 71c. For example, when the vehicle is caught in a muddy road, the rider can grip on the corner portions 71b, 71c of the front carrier 32 by his or her hands to push or pull out the vehicle from the mud.

The mounting holes 73h, 73j are formed so as to be spaced apart from each other in the front-rear direction of the vehicle with the mounting hole 73h placed ahead of the mounting hole 73j. The mounting holes 73k, 73m are formed so as to be spaced apart from each other in the front-rear direction of the vehicle with the mounting hole 73k placed ahead of the mounting hole 73m and are disposed further transversely outwards than the mounting holes 73h, 73j. The mounting hole 73h and the mounting holes 73k, 73j, 73m are disposed in order from the front in the front-rear direction.

The cut-out portion 73f is disposed between the mounting holes 73k, 73m.

The loop portion 71a, the resting plate 73 and part of the cross member 72 described above (a portion located further transversely outwards than the forward extending frame portion 79) make up the side resting portion 51.

The cross member 72 is disposed to extend between the left and right side resting portions 51.

A distance in the front-rear direction from a front end of the front cross member portion 75 to a rear end of the cross member 72 is shorter than a longitudinal width of the side resting portion 51.

The storage portion 83 and the maintenance lid 84 disposed behind the storage portion 83 are provided in the front center upper cover 48 below the front carrier 32 and between the left and right side resting portions 51 when seen from above.

The storage portion 83 is disposed between the left and right forward extending frame portions 79 and between the cross member 72 and the front cross member portion 75 when seen from above. Additionally, the storage portion 83 is disposed between the left and right side resting portions 51. That is, when seen from above, the storage portion 83 is disposed within a space 85 surrounded by a grid made up of the left and right forward extending frame portions 79, the cross member 72 and the front cross member portion 75 of the front carrier 32.

The maintenance lid 84 is disposed between the left and right forward extending frame portions 79 and below and rearwards of the cross member 72 when seen from above. The storage portion 83 includes a storage portion lid 86 that can be opened and closed.

Figure 9:
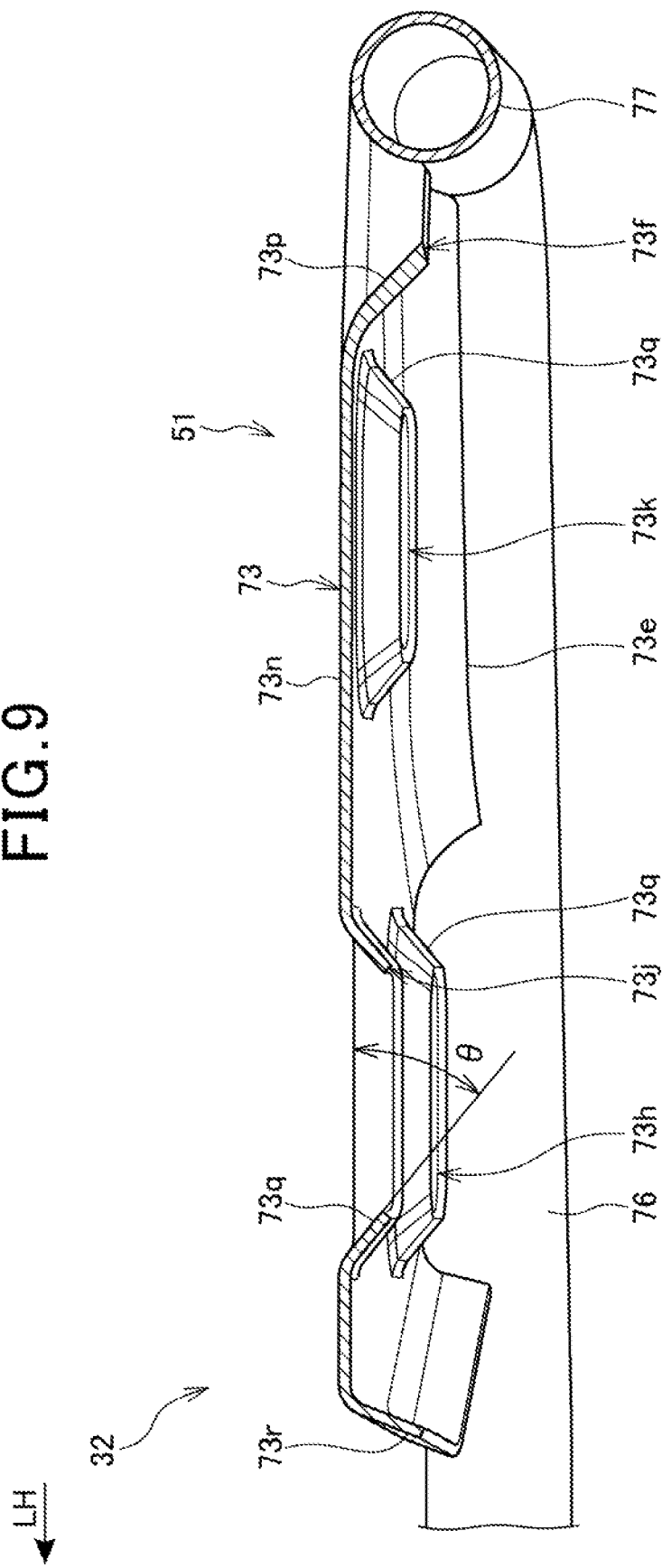
FIG. 9 is a sectional view of the front carrier.

FIG. 9 is a drawing illustrating a section of the front carrier 32 taken along a line IX-IX shown in FIG. 8 and as seen obliquely from a position below.

The resting plates 73 each include a flat plate portion 73n, a cut-out portion inclined portion 73p, a mounting hole inclined portion 73q and a circumferential edge portion inclined portion 73r.

The flat plate portion 73n is a portion formed flat. The cut-out portion inclined portion 73p and the circumferential edge portion inclined portion 73r are formed on an outer circumferential portion of the flat plate portion 73n. Additionally, the mounting hole inclined portion 73q is formed on circumferential edge portions of the cut-out portions 73e, 73f, 73g which are formed in the flat plate portion 73n.

In FIGS. 8 and 9, the cut-out portion inclined portion 73p is a portion formed on an edge portion of the cut-out portion 73f by being bent so as to be inclined downwards from the flat plate portion 73n. As with the edge portion of the cut-out portion 73f, cut-out portion inclined portions 73s, 73t are formed on edge portions of the cut-out portions 73e, 73g by being bent so as to be inclined downwards from the flat plate portion 73n.

The cut-out portion inclined portions 73p, 73s, 73t described above have the same or substantially the same inclined angle.

The mounting hole inclined portion 73q is a portion that is bent downwards at an inner circumferential edge portion of the mounting hole 73j so as to be inclined from the flat plate portion 73n and is inclined at an angle θ relative to the flat plate portion 73n. The inclination angle θ is set at 30°θ50°, for example.

Mounting hole inclined portions 73q are formed also at inner circumferential edge portions of the mounting holes 73h, 73k, 73m, as done at the edge portion of the mounting hole 73j, and these mounting hole inclined portions 73q are also bent downwards so as to be inclined from the flat plate portion 73n.

The circumferential edge portion inclined portion 73r is a portion that is bent downwards at an inner edge portion of the flat plate portion 73n so as to be inclined from the flat plate portion 73n. Specifically, the circumferential edge portion inclined portion 73r is formed at a portion of an inner edge portion of the resting plate 73 which lies from the front inclined frame portion 76 to the inwardly extending frame portion 78 and includes inner edge portions of the arm portions 73a, 73d.

The resting plate 73 is pressed so that the cut-out portion inclined portions 73p, 73s, 73t, the mounting hole inclined portions 73q and the circumferential edge portion inclined portion 73r described above are formed.

An inclination angle of the circumferential edge portion inclined portion 73r relative to the flat plate portion 73n is greater than the angle θ.

As described above, the rigidity of the resting plate 73 can be enhanced by forming the cut-out portion inclined portions 73p, 73s, 73t, the mounting hole inclined portions 73q and the circumferential edge portion inclined portion 73r on the resting plate 73. Additionally, the supporting rigidity of an attachment can be improved when the attachment is attached to the edge portions of the mounting holes 73h, 73j, 73k, 73m by providing the mounting hole inclined portions 73q.

Figure 10:
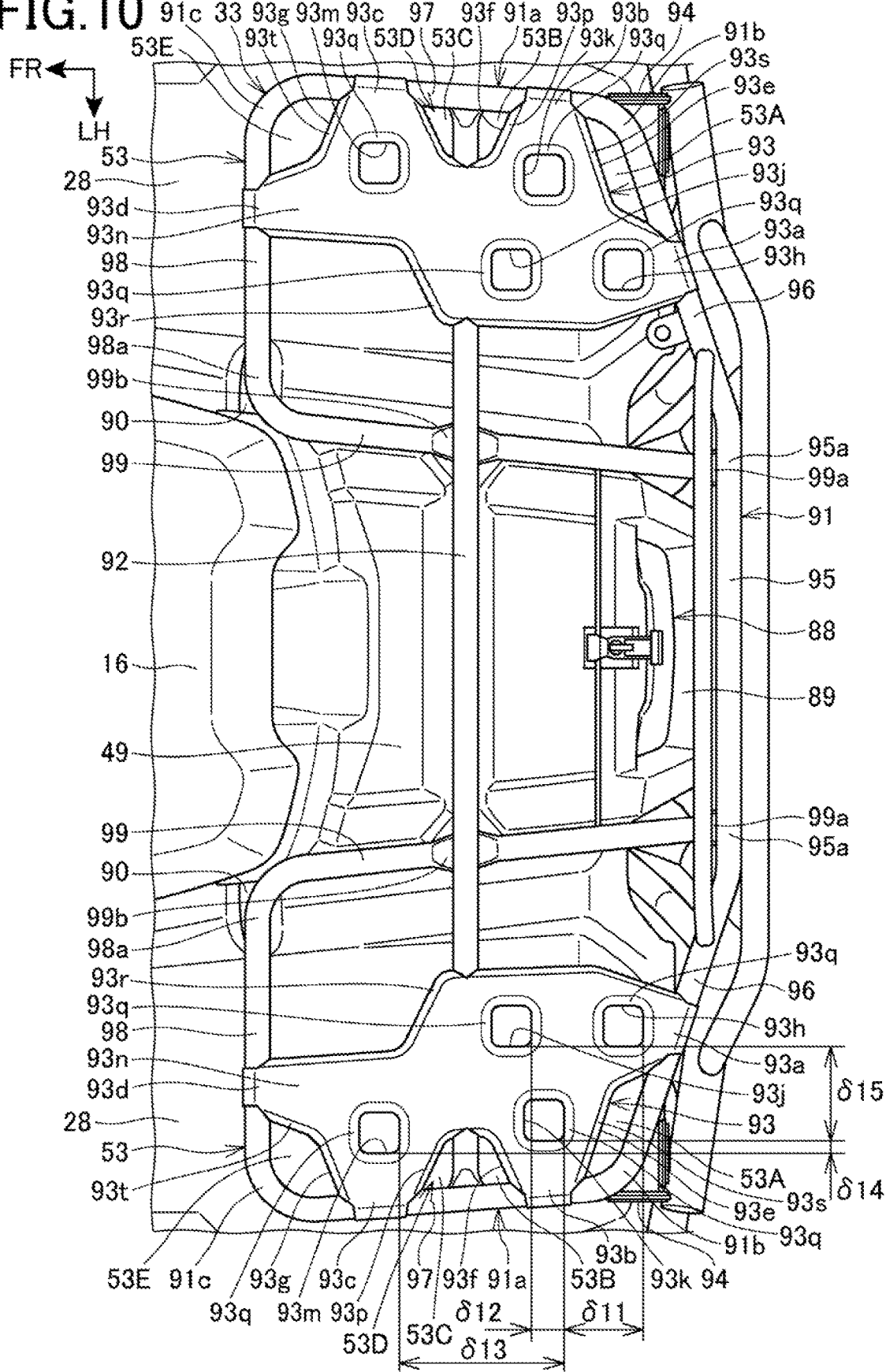
FIG. 10 is a plan view illustrating a rear carrier and a periphery thereof.

FIG. 10 is a plan view illustrating the rear carrier 33 and a periphery thereof.

The rear carrier 33 includes a loop frame portion 91 made up of a single tube frame including loop-shaped loop portions 91a at the left and right thereof, a cross member 92 extending across the left and right loop portions 91a in the vehicle's width direction, and resting plates 93 attached to the left and right loop portions 91a.

The loop frame portion 91 is made up of a rear cross member portion 95, a pair of left and right rear inclined frame portions 96, a pair of left and right forward extending frame portion 97, a pair of left and right inwardly extending frame portion 98, and a pair of left and right rearward extending frame portion 99.

The rear cross member portion 95 is disposed behind the cross member 92 so as to extend in the vehicle's width direction. The left and right rear inclined frame portions 96 extend transversely outwards obliquely toward the front from both end portions of the rear cross member portion 95. The left and right forward extending frame portion 97 extend to the rear from distal ends of the left and right rear inclined frame portions 96. Both end portions of the cross member 92 are attached to the left and right forward extending frame portions 97.

The left and right inwardly extending frame portions 98 extend transversely inwards from the left and right forward extending frame portions 97. The left and right rearward extending frame portions 99 extend toward the rear of the vehicle from inner ends of the inwardly extending frame portions 98.

Rear end portions 99a of the rearward extending frame portions 99 are collapsed into a flat-plate shape to be attached to the rear cross member portion 95. Inner end portions 98a of the inwardly extending frame portions 98 are attached to the rear center upper cover 49 and upper ends of frame members 90 extending from the body frame 11 (refer to FIG. 1) below the left and right rear mudguards 28.

Left and right end portions 95a of the rear cross member portion 95 are fixed to rear end portions 99a of the left and right rearward extending frame portions 99 through welding.

A rear bumper 55 is connected to corner portions 91b between the rear inclined frame portions 96 and the forward extending frame portions 97 via connecting members 94.

The left and right rearward extending frame portions 99 are collapsed at middle portions to form compressed portions 99b, and the cross member 92 is fixed to the left and right compressed portions 99b and the left and right forward extending frame portions 97 through welding.

The loop portions 91a are made up of the end portions 95a of the rear cross member portions 95, the rear inclined frame portions 96, the forward extending frame portions 97, the inwardly extending frame portions 98, and the rearward extending frame portions 99 described above.

The resting plates 93 are each formed by bending and making holes in a flat plate and are attached to the rear inclined frame portions 96, the forward extending frame portions 97, the inwardly extending frame portions 98 and the cross member 92.

The resting plates 93 each include a plurality of arm portions 93a, 93b, 93c, 93d, cut-out portions 93e, 93f, 93g which are formed between these arm portions 93a, 93b, 93c, 93d, and a plurality of mounting holes 93h, 93j, 93k, 93m.

Various types of attachments capable of fixing, holding and accommodating goods are detachably locked on edge portions of the plurality of mounting holes 93h, 93j, 93k, 93m.

Here, one mounting hole 93k is set as a reference hole. The mounting hole 93h is offset forwards by δ11 with respect to the mounting hole 93k, the mounting hole 93j is offset rearwards by δ12 with respect to the mounting hole 93k, and the mounting hole 93m is offset forwards by δ13 with respect to the mounting hole 93k.

In addition, the mounting hole 93m is offset transversely outwards by δ14 with respect to the mounting hole 93k, and the mounting holes 93h, 93j are offset transversely inwards by δ15 with respect to the mounting hole 93k.

The arm portion 93a is attached to the rear inclined frame portion 96, and the arm potions 93b, 93c are attached to the forward extending frame portion 97, and the arm portion 93d is attached to the inwardly extending frame portion 98.

The cut-out portion 93e is formed inside a corner portion 91b formed by the rear inclined frame portion 96 and the forward extending frame portion 97. The cut-out portion 93e, the rear inclined frame portion 96 and the forward extending frame portion 97 form a closed space 53A.

The cut-out portion 93f is formed inside the forward extending frame portion 97. The cut-out portion 93f, the cross member 92 and the forward extending frame portion 97 form a pair of closed spaces 53B, 53C on both sides of the cross member 92. The pair of spaces 53B, 53C forms a space 53D.

The cut-out portion 93g is formed inside a corner portion 91c formed by the forward extending frame portion 97 and the inwardly extending frame portion 98. The cut-out portion 93g, the forward extending frame portion 97 and the inwardly extending frame portion 98 form a closed space 53E.

An end portion of the cross member 92 is disposed inside the cut-out portion 93f.

The loop portion 91a can easily be gripped by providing the cut-out portions 93e, 93g described above inside the corner portions 91b, 91c. For example, when the vehicle is caught in a muddy road, the rider can grip on the corner portions 91b, 91c of the rear carrier 33 by his or her hands to push or pull out the vehicle from the mud.

The mounting holes 93h, 93j are formed so as to be spaced apart from each other in the front-rear direction of the vehicle with the mounting hole 93h placed ahead of the mounting hole 93j. The mounting holes 93k, 93m are formed so as to be spaced apart from each other in the front-rear direction of the vehicle with the mounting hole 93k placed ahead of the mounting hole 93m and are disposed further transversely outwards than the mounting holes 93h, 93j. The mounting hole 93h and the mounting holes 93k, 93j, 93m are disposed in order from the rear in the front-rear direction.

The cut-out portion 93f is disposed between the mounting holes 93k, 93m.

The loop portion 91a, the resting plate 93 and part of the cross member 92 described above (a portion located further transversely outwards than the rearward extending frame portion 99) make up the side resting portion 53.

The cross member 92 is disposed to extend between the left and right side resting portions 53.

A distance in the front-rear direction from a front end of the cross member 92 to a rear end of the rear cross member portion 95 is shorter than a longitudinal width of the side resting portion 53.

The resting plates 93 each include a flat plate portion 93*n*, cut-out portion inclined portions 93*p*, 93*s*, 93*t*, mounting hole inclined portions 93*q* and a circumferential edge portion inclined portion 93*r*.

The flat plate portion 93*n* is a portion formed flat. The cut-out portion inclined portions 93*p*, 93*s*, 93*t* and the circumferential edge portion inclined portion 93*r* are formed on an outer circumferential portion of the flat plate portion 93*n*. Additionally, the mounting hole inclined portions 93*q* are formed on circumferential edge portions of the cut-out portions 93*e*, 93*f*, 93*g* which are formed in the flat plate portion 93*n*.

The cut-out portion inclined portions 93*p*, 93*s*, 93*t* are portions formed on edge portions of the cut-out portions 93*f*, 93*e*, 93*g* by being bent so as to be inclined downwards from the flat plate portion 93*n*.

The cut-out portion inclined portions 93*p*, 93*s*, 93*t* described above have the same or substantially the same inclined angle.

The mounting hole inclined portions 93*q* are portions that are bent downwards at inner circumferential edge portions of the mounting hole 93*h*, 93*j*, 93*k*, 93*m* so as to be inclined from the flat plate portion 93*n* and are inclined at an angle θ (refer to FIG. 9) relative to the flat plate portion 93*n*.

The circumferential edge portion inclined portion 93*r* is a portion that is bent downwards at an inner edge portion of the flat plate portion 93*n* so as to be inclined from the flat plate portion 93*n*. Specifically, the circumferential edge portion inclined portion 93*r* is formed at a portion of an inner edge portion of the resting plate 93 which lies from the rear inclined frame portion 96 to the inwardly extending frame portion 98 and includes inner edge portions of the arm portions 93*a*, 93*d*.

The resting plate 93 is pressed so that the cut-out portion inclined portions 93*p*, 93*s*, 93*t*, the mounting hole inclined portions 93*q* and the circumferential edge portion inclined portion 93*r* described above are formed.

An inclination angle of the circumferential edge portion inclined portion 93*r* relative to the flat plate portion 93*n* is greater than the angle θ.

As described above, the rigidity of the resting plate 93 can be enhanced by forming the cut-out portion inclined portions 93*p*, 93*s*, 93*t*, the mounting hole inclined portions 93*q* and the circumferential edge portion inclined portion 93*r* on the resting plate 93. Additionally, the supporting rigidity of an attachment can be improved when the attachment is attached to the edge portions of the mounting holes 93*h*, 93*j*, 93*k*, 93*m* by providing the mounting hole inclined portions 93*q*.

A storage portion 88 is provided below the rear carrier 33 and at the rear part of the rear center upper cover 49 between the left and right side resting portions 53 when seen from above.

The storage portion 88 is disposed between the left and right rearward extending frame portions 99 and between the cross member 92 and the rear cross member portion 95 when seen from above. Additionally, the storage portion 88 is disposed between the left and right side resting portions 53.

The storage portion 88 includes a storage portion lid 89 that can be opened and closed.

Figure 11:
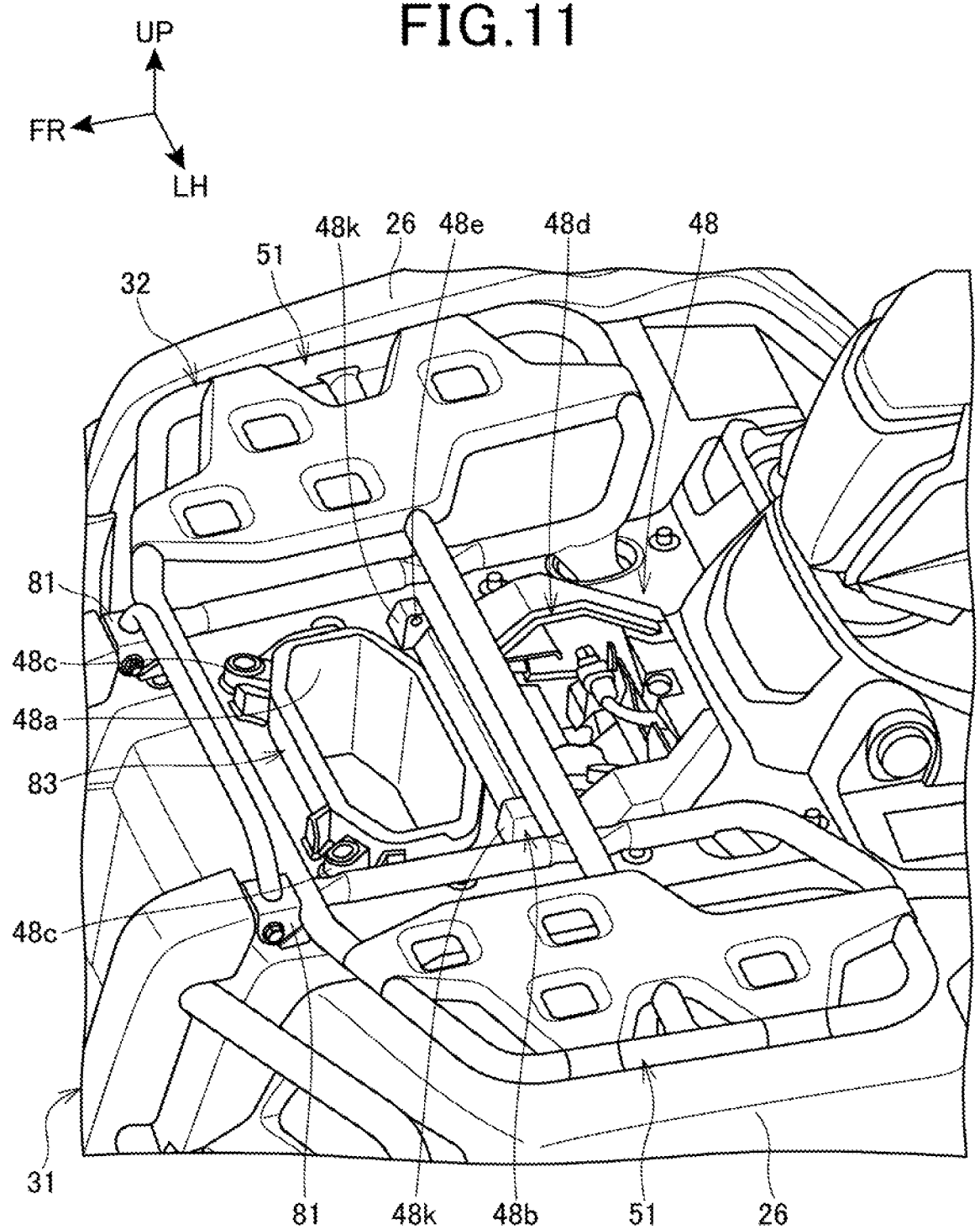
FIG. 11 is a perspective view illustrating a front portion of a body.

FIG. 11 is a perspective view illustrating the front portion of the vehicle.

In the figure, the storage portion lid 86 (refer to FIG. 8) of the storage portion 83 and the maintenance lid 84 (refer to FIG. 8) are removed.

The storage portion 83 is made up of a storage portion main body 48*a*, which is formed depressed integrally on the front center upper cover 48 for storing goods, and the storage portion lid 86 configured to cover the storage portion main body 48*a* from above. A lid support portion 48*b* is integrally provided behind the storage portion main body 48*a* on the front center upper cover 48 to swingably support a rear end portion of the storage portion lid 86.

The storage portion main body 48*a* has a pair of left and right lid lock portion 48*c* provided at a front side thereof to lock a front end portion of the storage portion lid 86.

A maintenance opening 48*d* is formed behind the storage portion on the front center upper cover 48, and this maintenance opening 48*d* is opened and closed by the maintenance lid 84.

A cooling system (for example, a radiator and a reservoir tank for the radiator, which will both be described later) of the power unit and various types of electrical parts are serviced for maintenance through the maintenance opening 48*d*.

FIG. 12 illustrates plan views illustrating the storage portion 83 and the maintenance opening 48*d* in the front portion of the vehicle.

Figure 12A:
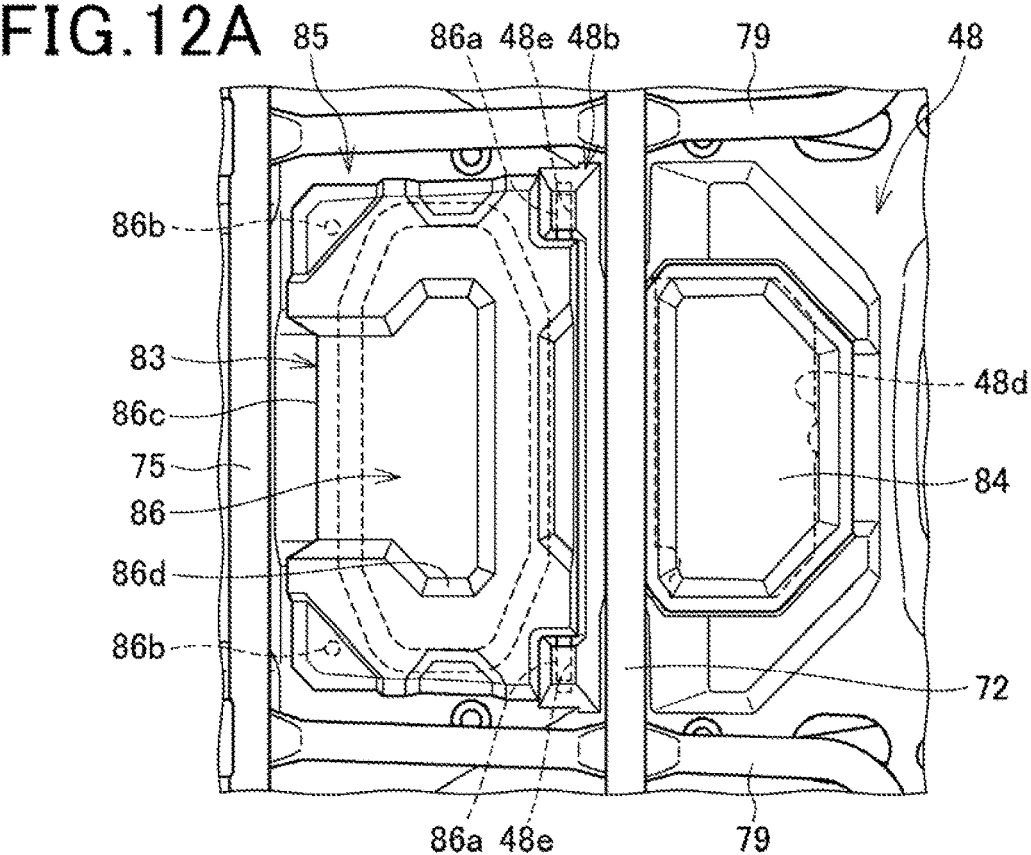
FIG. 12A is a plan view illustrating a state where a storage portion lid and a maintenance lid are closed.
Figure 12B:
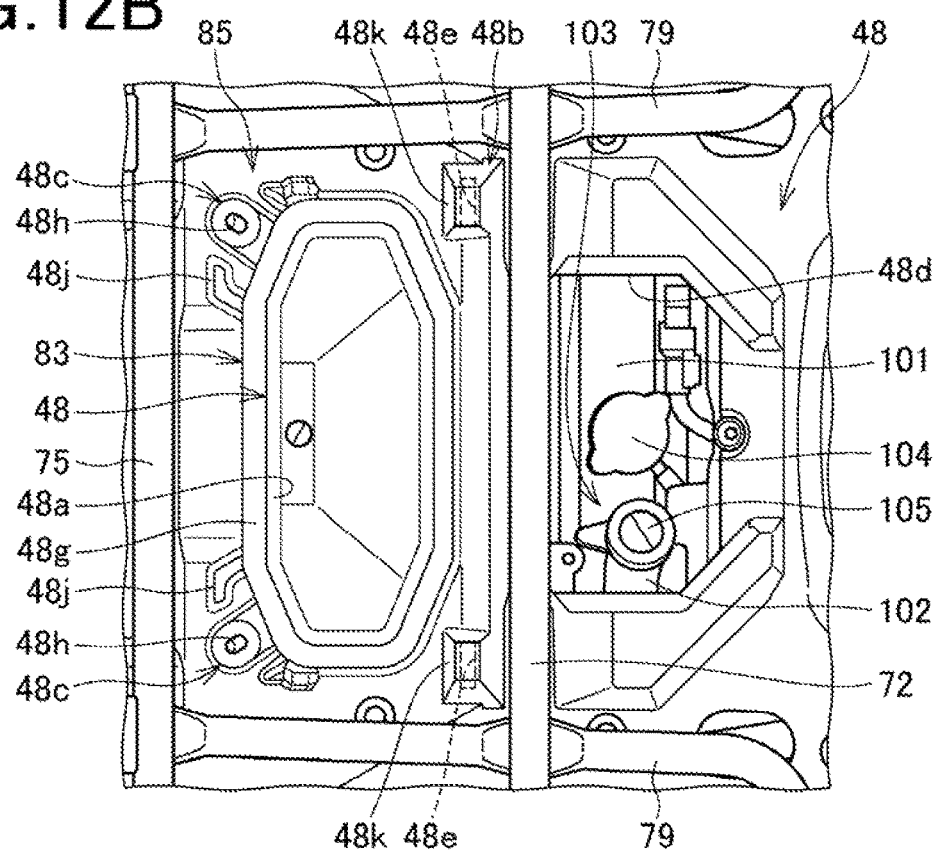
FIG. 12B is a plan view illustrating a state where the storage portion lid and the maintenance lid are removed.

FIG. 12A is a view illustrating a state where the storage portion lid 86 and the maintenance lid 84 are closed, and FIG. 12B is a view illustrating a state where the storage portion lid 86 and the maintenance lid 84 are both removed.

As illustrated in FIG. 12A, the storage portion lid 86 has a rectangular shape when seen from above and includes a pair of left and right hinge shafts 86*a* provided at the left and right of the rear end portion, a pair left and right lock portion 86*b* provided on a left and right lower surfaces of a front end portion, and a cut-out portion 86*c* formed at a transversely central portion of a front edge.

The left and right hinge shafts 86*a* are rotatably inserted individually in a pair of left and right hinge shaft insertion holes 48*e* provided at both end portions of the lid support portion 48*b*. The storage portion lid 86 can be opened from and closed to the storage portion main body 48*a* by fitting the left and right hinge shafts 86*a* in the corresponding hinge shaft insertion holes 48*e*.

The left and right lock portions 86*b* are locked individually at left and right lid lock portion 48*c* (refer to FIG. 12B) of the storage portion main body 48*a*.

The cut-out portion 86*c* is formed so as to continue to a front end portion of a recessed portion 86*d* formed on an upper surface of the storage portion lid 86. The cut-out portion 86*c* is disposed in a position that can be reached by the rider when the rider stands up from a riding position where the rider sits on the seat 16 (refer to FIG. 1) and stretches his or her arm. This enables the rider to put his or her hand on the cut-out portion 86*c* while standing up from the seat 16 to open or close the storage portion lid 86. The storage portion lid 86 can be attached to and detached from the lid support portion 48*b*.

The maintenance lid 84 is formed into a shape in which a width in the vehicle's width direction of a rear portion is gradually narrowed as it extends toward the rear. A front end portion of the maintenance lid 84 is swingably supported on the front center upper cover 48, and a rear end portion is locked on the front center upper cover 48. The maintenance lid 84 can be attached to and detached from the front center upper cover 48.

As illustrated in FIG. 12B, the recessed storage portion main body 48*a* of the storage portion 83 has an opening 48*f* having a contour of the shape of a deformed octagon which is elongated in the vehicle's width direction when seen from above. A pair of left and right lid lock portions 48*c* are formed at a front side of an edge portion 48*g* of the storage portion main body 48*a* so as to extend from the edge portion 48g, and a lid lock hole 48h is opened in each of the left and right lid lock portions 48c. The left and right lock portions 86b of the storage portion lid 86 are inserted individually in the corresponding left and right lid lock holes 48h to be locked therein.

A pair of left and right reinforcement ribs 48j are formed on transversely inner sides of the left and right lid lock portions 48c so as to extend to a front side from the edge portion 48g, whereby the storage portion 83 is reinforced by the reinforcement ribs 48j.

The lid support portion 48b is formed at the rear of the edge portion 48g of the storage portion 83 so as to extend in the vehicle's width direction. Hinge shaft support portions 48k are formed ahead of both end portions of the lid support portions 48b so as to project to the front, and hinge shaft insertion holes 48e are opened individually in the left and right hinge shaft support portions 48k so as to extend in the vehicle's width direction.

A radiator 101 and a reservoir tank 102 connected to the radiator 101 by way of a hose are disposed below the maintenance opening 48d, and the radiator 101 and the reservoir tank 102 can be confirmed visually from the maintenance opening 48d. The radiator 101 and the reservoir tank 102 described above make up an engine cooling component 103.

The radiator 101 includes a radiator cap 104 configured to close its fluid inlet port. The reservoir tank 102 includes a cap 105 configured to close its fluid inlet port. Both the radiator cap 104 and the cap 5 can be confirmed visually from the maintenance opening 48d.

Figure 13:
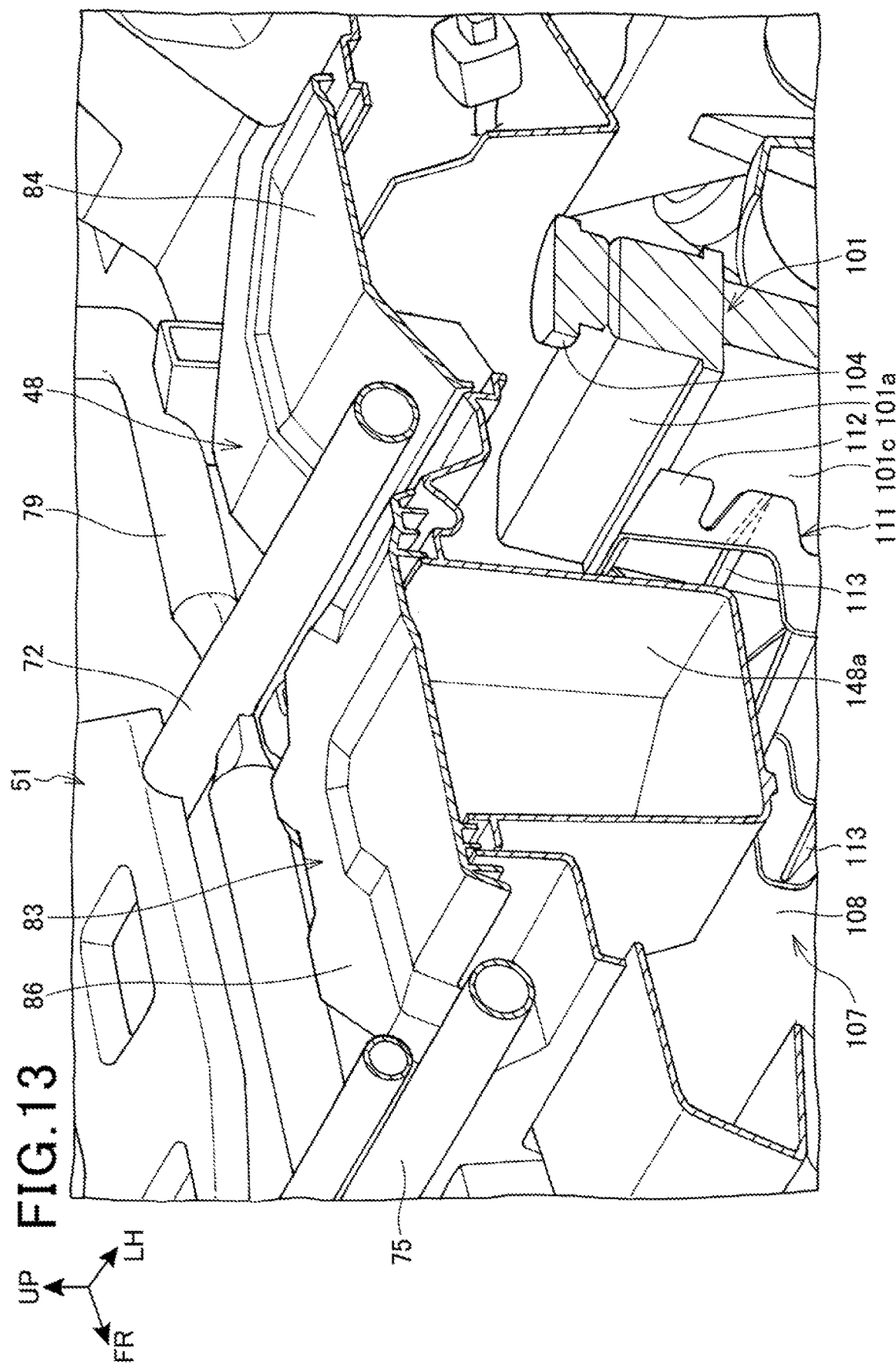
FIG. 13 is a perspective view of a section taken along a line XIV-XIV in FIG. 8 as seen obliquely from a front upper position.
Figure 14:
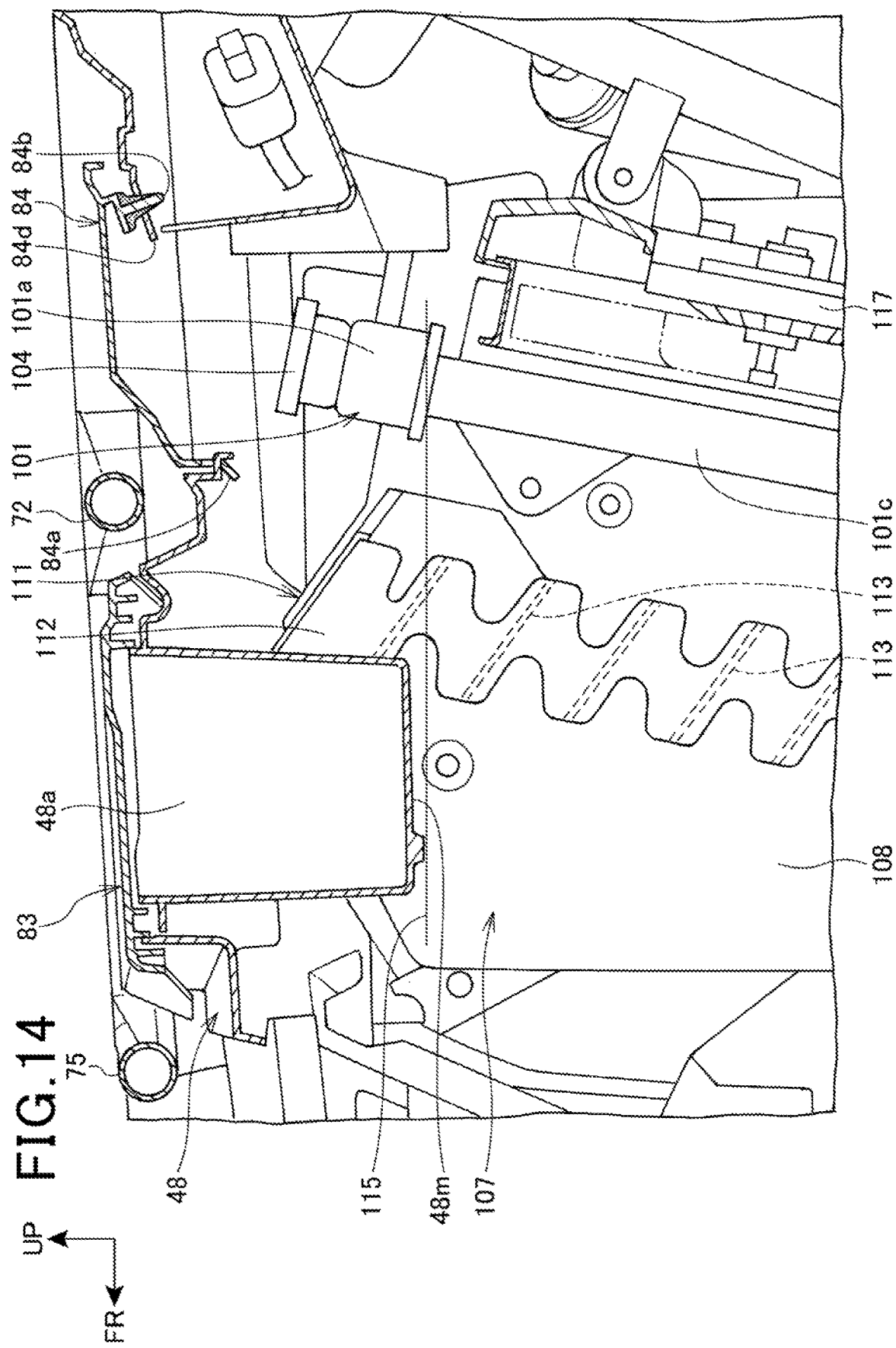
FIG. 14 is a sectional view taken along the line XIV-XIV in FIG. 8.

FIG. 13 is a perspective view of a section taken along a line XIV-XIV in FIG. 8 as seen obliquely from a front upper position. FIG. 14 is a sectional view taken along the line XIV-XIV in FIG. 8.

As illustrated in FIGS. 13 and 14, an air guide space 107, configured to guide running air, is formed below the front center upper cover 48.

The air guide space 107 is formed by the front center upper cover 48, and a pair of left and right side plates 198 disposed below the front center upper cover 48.

The storage portion 83 (specifically, the storage portion main body 48a), the radiator 101 and louvers 111 disposed ahead of the radiator 101 are disposed in the air guide space 107 between the left and right side plates 108.

The front center upper cover 48, the left and right side plates 108, and the louvers 111 described above make up an air guide portion 110 configured to guide running air to the radiator 101.

The louver 111 is disposed behind and below the storage portion main body 48a and is made up of a frame portion 112 and a plurality of slats 113 which are disposed in the frame portion 112 so as to extend in the vehicle's width direction and to be spaced apart from one another at predetermined intervals in the up-down direction.

Running air flowing into the air guide space 107 from the front of the vehicle passes below the storage portion main body 48a, is rectified toward the direction of the radiator 101 by the plurality of slats 113 of the louver 111, is struck against the radiator 101, and is discharged to the rear of the radiator 101 through the radiator 101.

The radiator 101 includes an upper tank 101a configured to reserve a cooling water, a lower tank (not shown), and a core 101c configured to connect the upper tank 101a and the lower tank together. The core 101c includes a plurality of water passages connecting the upper tank 101a with the lower tank and fins provided between adjacent water passages. When running air passes through the core 101c, whereby the cooling water within the radiator 101 is cooled.

When drawing a horizontal line 115 from an upper end of the core 101c, the horizontal line 115 is located below a bottom wall 48m of the storage portion main body 48a. That is, the core 101c is located further downwards than the bottom wall 48m of the storage portion main body 48a.

A cooling fan 117, configured to force running air into the core 101c for passage, is disposed behind the radiator 101.

As described above, running air can be brought against the radiator 101 effectively by forming the air guide space 107 below the front center upper cover 48. Additionally, running air can be directed toward the radiator 101 so as to easily strike against the radiator 101 by disposing the louver 111 within the air guide space 107. These configurations can enhance further the cooling effect of the radiator 101.

As illustrated in FIG. 14, an engagement portion 84a, configured to be swingably engaged with an edge portion of the maintenance opening 48d in a swinging fashion, is provided on a lower surface of a front end portion of the maintenance lid 84, and a lock portion 84b, configured to be locked on the edge portion of the maintenance opening 48d, is provided on a lower surface of a rear end portion of the maintenance lid 84.

The engagement portion 84a constitutes a hinge portion when opening and closing the maintenance lid 84. Additionally, the engagement portion 84a can be removed by releasing the engagement of the engagement portion 84a from the edge portion of the maintenance opening 48d.

The maintenance lid 84 is kept closed as a result of the lock portion 84b being locked on the edge portion of the maintenance opening 48d.

As illustrated in FIGS. 3, 12A, 12B and 14 described above, in the all-terrain running vehicle 10 as a vehicle, the front center upper cover 48 as the front body cover is provided between the pair of left and right front mudguards 26 configured to cover above the pair of left and right front wheels 12, and the storage portion 83 is provided on the front center upper cover 48 of the front body 10F. The front carrier 32 as the carrier in which the loop frame portion 71 and the cross member 72, which both constitute the frame members, are combined into the grid shape is disposed above the front center upper cover 48. The storage portion 83 is set in the space 85 surrounded by the grid of the front carrier 32 when seen from above.

The engine cooling component 103 as the body component is disposed below the front center upper cover 48. The storage portion 83 is disposed ahead of the engine cooling component 103. The maintenance lid 84 configured to cover the engine cooling component 103 from above is provided on the front center upper cover 48, and the maintenance lid 84 is positioned behind the storage portion 83.

According to this configuration, since the storage portion 83 can be set by avoiding the engine cooling component 103, and the storage portion 83 is formed inside the space surrounded by the grid of the front carrier 32 when seen from above, the egress and ingress of stored articles from and into the storage portion 83 can be facilitated. Further, the maintenance lid 84 is disposed behind the storage portion 83, whereby the engine cooling component 103 (specifically, the radiator 101, the reservoir tank 102) can be serviced for maintenance from the upper side of the body.

As illustrated in FIG. 8, the cross member 72 and the front cross member portion 75 as a plurality of bridge portions disposed before and after are formed by the loop frame portion 71 and the cross member 72. The front carrier 32 is made up of the side resting portions 51 as the pair of left and right resting portions and at least a pair of the cross member 72 and the front cross member portion 75 configured to connect together the left and right side resting portions 51. The storage portion 83 is disposed in the space surrounded by the left and right side resting portions 51, the cross member 72 and the front cross member portion 75 when seen from above.

According to this configuration, the vehicle can be constructed so as to facilitate the egress and ingress of stored articles from and into the storage portion 83 while ensuring the restability of the front carrier 32 by the side resting portions 51.

The cross member 72 is disposed so as to extend in the vehicle's width direction between the storage portion 83 and the maintenance lid 84 when seen from above.

According to this configuration, the front carrier 32 does not interrupt the egress and ingress of stored articles from and into the storage portion 83 and the opening and closing of the maintenance lid 84, whereby the restability of the front carrier 32 can be ensured.

As illustrated in FIGS. 12A, 12B and 14, the storage portion lid 86 as the lid supported swingably is provided on the storage portion 83. The storage portion lid 86 includes the hinge shaft 86a as the hinge portion at the rear end portion and is opened from a front side to a rear side of the body. The maintenance lid 84 includes the engagement portion 84a on the front side of the body and includes the lock portion 84b on the rear side of the body and is opened from the rear side to the front side of the body.

According to this configuration, the storage portion lid 86 of the storage portion 83 can be opened from the front of the body, and the maintenance lid 84 can be opened from the rear body riding position or the side of the body.

As illustrated in FIG. 12A, the storage portion lid 86 of the storage portion 83 includes the cut-out portion 86c on the front side.

According to this configuration, the rider can rise from the riding position on the body to put his or her hand into the cut-out portion 86c to open and close the storage portion lid 86.

As illustrated in FIGS. 12B and 14, the body component is the engine cooling component 103 made up of the radiator 101 and the reservoir tank 102. The air guide portion 110 configured to guide running air to the radiator 101 is formed below the front center upper cover 48 and ahead of the radiator 101, and the storage portion 83 is positioned in the air guide space 107 formed in the air guide portion 110.

According to this configuration, the space where to dispose the storage portion 83 is easily ensured, and running air can be applied effectively to the radiator 101 by the air guide portion 110 to thereby improve the cooling capability of the radiator.

The lower surface of the storage portion 83 (specifically, the lower surface of the bottom wall 48m) is positioned above the core 101c of the radiator 101.

According to this configuration, the storage portion 83 never interrupts the application of running air to the core 101c or the radiator 101, thereby making it possible to ensure the cooling capability of the radiator 101.

The embodiment that has been described above describes only one aspect of the present invention, and hence, the embodiment can be modified and applied to arbitrarily without departing from the spirit and scope of the present invention.

For example, in the embodiment described above, as illustrated in FIGS. 8 and 10, while the left and right resting plates 73 on the front carrier 32 are provided separately from the resting plates 93 on the rear carrier 33, the present invention is not limited to this. For example, the left-hand side resting plate 73 on the front carrier 32 and the right-hand side resting plate 93 on the rear carrier 33 may be formed into the same shape so that they become common parts. Similarly, the right-hand side resting plate 73 on the front carrier 32 and the left-hand side resting plate 93 on the rear carrier 33 may be formed into the same shape so that they become common parts.

Additionally, as illustrated in FIG. 11, while the storage portion main body 48a of the storage portion 83 is formed integrally on the front center upper cover 48, the present invention is not limited to this. For example, a storage portion main body may be formed separately from the front center upper cover 48 to be attached to the front center upper cover 48.

In addition, while the present invention has been described as being applied to the all-terrain running vehicle 10, which is the four-wheeled saddle riding vehicle, the invention is not limited to this, and hence, the present invention may be applied to a three-wheeled saddle riding vehicle. Alternatively, the present invention may be applied to a vehicle with a storage portion and a maintenance lid other than the saddle riding vehicles.

REFERENCE SIGN LIST 10 all-terrain running vehicle (vehicle)
10F front body
32 front carrier (carrier)
48 front center upper cover (body cover)
51 side resting portion (resting portion)
71 loop frame portion (frame member)
72 cross member (frame member, bridge portion)
75 front cross member portion (bridge portion)
83 storage portion
84 maintenance lid
84a engagement portion
84b lock portion
86 storage portion lid (lid)
86a hinge shaft (hinge portion)
86c cut-out portion
101 radiator
101c core
102 reservoir tank
103 engine cooling component (body component)
107 air guide space
110 air guide portion

What is claimed is:

1. A vehicle comprising a front body cover provided between a pair of left and right front mudguards configured to cover above a pair of left and right front wheels, a storage portion being provided on the front body cover, a carrier formed by combining frame members into a grid shape being disposed above the front body cover, the storage portion being set in a space surrounded by the grid of the carrier when seen from above,
   wherein a body component is disposed below the front body cover,
   wherein the storage portion is disposed ahead of the body component,
   wherein a maintenance lid configured to cover the body component is provided on the front body cover, and
   wherein the maintenance lid is located behind the storage portion.

2. The vehicle according to claim 1,
wherein a plurality of bridge portions disposed before and after are formed by the frame members,
wherein the carrier is made up of a pair of left and right resting portions and at least a pair of the bridge portions configured to connect together the left and right resting portions, and
wherein the storage portion is disposed in a space surrounded by the left and right resting portions and the bridge portions, when seen from above.

3. The vehicle according to claim 2,
wherein the bridge portion is disposed so as to extend in a vehicle's width direction between the storage portion and the maintenance lid, when seen from above.

4. The vehicle according to claim 1,
wherein a lid supported swingably is provided on the storage portion,
wherein the lid comprises a hinge portion at a rear end portion so as to open from a front side to a rear side of the body, and
wherein the maintenance lid comprises an engagement portion on the front side of the body and comprises a lock portion on the rear side of the body so as to open from the rear side to the front side of the body.

5. The vehicle according to claim 4,
wherein the lid of the storage portion comprises a cut-out portion on a front side.

6. The vehicle according to claim 1,
wherein the body component is an engine cooling component made up of a radiator and a reservoir tank,
wherein an air guide portion configured to guide running air to the radiator is formed below the front body cover and ahead of the radiator, and
wherein the storage portion is positioned in an air guide space formed in the air guide portion.

7. The vehicle according to claim 6,
wherein a lower surface of the storage portion is positioned above a core of the radiator.

8. The vehicle according to claim 2,
wherein a lid supported swingably is provided on the storage portion,
wherein the lid comprises a hinge portion at a rear end portion so as to open from a front side to a rear side of the body, and
wherein the maintenance lid comprises an engagement portion on the front side of the body and comprises a lock portion on the rear side of the body so as to open from the rear side to the front side of the body.

9. The vehicle according to claim 3,
wherein a lid supported swingably is provided on the storage portion,
wherein the lid comprises a hinge portion at a rear end portion so as to open from a front side to a rear side of the body, and
wherein the maintenance lid comprises an engagement portion on the front side of the body and comprises a lock portion on the rear side of the body so as to open from the rear side to the front side of the body.

10. The vehicle according to claim 2,
wherein the body component is an engine cooling component made up of a radiator and a reservoir tank,
wherein an air guide portion configured to guide running air to the radiator is formed below the front body cover and ahead of the radiator, and
wherein the storage portion is positioned in an air guide space formed in the air guide portion.

11. The vehicle according to claim 3,
wherein the body component is an engine cooling component made up of a radiator and a reservoir tank,
wherein an air guide portion configured to guide running air to the radiator is formed below the front body cover and ahead of the radiator, and
wherein the storage portion is positioned in an air guide space formed in the air guide portion.

12. The vehicle according to claim 4,
wherein the body component is an engine cooling component made up of a radiator and a reservoir tank,
wherein an air guide portion configured to guide running air to the radiator is formed below the front body cover and ahead of the radiator, and
wherein the storage portion is positioned in an air guide space formed in the air guide portion.

13. The vehicle according to claim 5,
wherein the body component is an engine cooling component made up of a radiator and a reservoir tank,
wherein an air guide portion configured to guide running air to the radiator is formed below the front body cover and ahead of the radiator, and
wherein the storage portion is positioned in an air guide space formed in the air guide portion.

* * * * *